(12) United States Patent
Kodosky et al.

(10) Patent No.: US 7,216,334 B2
(45) Date of Patent: May 8, 2007

(54) SELF-DETERMINING BEHAVIOR NODE FOR USE IN CREATING A GRAPHICAL PROGRAM

(75) Inventors: Jeffrey L. Kodosky, Austin, TX (US); Adam Gabbert, Austin, TX (US); Steven W. Rogers, Austin, TX (US)

(73) Assignee: National Instruments Corporation, Austin, TX (US)

( * ) Notice: Subject to any disclaimer, the term of this patent is extended or adjusted under 35 U.S.C. 154(b) by 588 days.

(21) Appl. No.: 10/094,198

(22) Filed: Mar. 8, 2002

(65) Prior Publication Data

US 2003/0172369 A1    Sep. 11, 2003

(51) Int. Cl.
*G06F 9/44* (2006.01)

(52) U.S. Cl. ...................................... 717/109; 717/113

(58) Field of Classification Search ........ 717/104–109, 717/136–161; 703/1–22
See application file for complete search history.

(56) References Cited

U.S. PATENT DOCUMENTS

| | | | |
|---|---|---|---|
| 5,301,301 A * | 4/1994 | Kodosky et al. .............. | 716/11 |
| 5,481,741 A | 1/1996 | McKaskle et al. | |
| 6,366,300 B1 * | 4/2002 | Ohara et al. ................. | 715/771 |
| 6,738,964 B1 * | 5/2004 | Zink et al. ................... | 717/105 |

* cited by examiner

*Primary Examiner*—Tuan Dam
*Assistant Examiner*—Andre R Fowlkes
(74) *Attorney, Agent, or Firm*—Meyertons Hood Kivlin Kowert & Goetzel, P.C.; Jeffrey C. Hood; Jason L. Burgess

(57) ABSTRACT

A system and method for creating a graphical program utilizing one or more self-determining behavior (SDB) nodes. An SDB node may include associated generation code for programmatically generating execution-time code associated with the SDB node. The generation code associated with the SDB node may programmatically generate or modify the execution-time code based on or in response to any of various factors.

75 Claims, 18 Drawing Sheets

SELF-DETERMINING BEHAVIOR NODE FOR USE IN CREATING A GRAPHICAL PROGRAM

FIELD OF THE INVENTION

The present invention relates to the field of graphical programming, and more particularly to a system and method for creating a graphical program utilizing one or more self-determining behavior nodes.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level languages are typically translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programminmg environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al. disclose a graphical system and method for modeling a process, i.e., a graphical programming environment which enables a user to easily and intuitively model a process. The graphical programming environment disclosed in Kodosky et al. can be considered a higher and more intuitive way in which to interact with a computer. A graphically based programming environment can be represented at a level above text-based high level programming languages such as C, Basic, Java, etc.

The method disclosed in Kodosky et al. allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. The diagram may have one or more of data flow, control flow and/or execution flow representations. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al. teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can often be analogized to the front panel of an instrument. In an industrial automation application the front panel can often be analogized to the MMI (Man Machine Interface) of a device. The user may adjust the controls on the front panel to affect the input and view the output on the respective indicators. Alternatively, the user interface may be used merely to view the input and output, or just the output, and the input may not be interactively manipulable by the user during program execution.

Thus, graphical programming has become a powerful tool available to programmers. Graphical programming development environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

SUMMARY

One embodiment of the present invention comprises a self-determining behavior (SDB) node for use in a graphical program. An embodiment of the invention also comprises a system and method for creating a graphical program utilizing one or more self-determining behavior (SDB) nodes. The graphical program may include a plurality of interconnected nodes that visually indicate functionality of the graphical program. The graphical program may have one or more of a data flow, control flow, and/or execution flow representation.

A first node, also referred to as a self-determining behavior or SDB node, may be included or displayed in the graphical program. The SDB node includes associated generation code for programmatically generating execution-time code associated with the SDB node. The generation code generally executes prior to execution of the graphical program. In other words, the generation code generally does not execute at execution-time of the graphical program, but rather typically operates prior to graphical program execution. The generation code may operate at various times, such as design-time, edit-time, and/or compile-time, to programmatically generate the execution-time code. The execution-time code that is programmatically generated typically executes at graphical program execution time when the SDB node is executed in the graphical program.

The generation code associated with the SDB node may programmatically generate or modify the execution-time code based on or in response to any of various factors. The generation code may be operable to programmatically generate different types of execution-time code for the SDB node. In one embodiment, input to edit the graphical program may be received, and the generation code may operate to programmatically generate or modify first execution-time code based on the input. The programmatically generated first execution-time code may be associated with the SDB node in the graphical program in which the SDB node is included. In another embodiment, the execution-time code may be programmatically generated or modified based on code generation dependency information, wherein the code generation dependency information may include any kind of information from any source.

In various embodiments, the generation code associated with the SDB node may execute to programmatically generate or modify the execution-time code for the SDB node at various times, such as when a graphical program including the SDB node is being edited, when the graphical program is being compiled, just prior to execution of the graphical program, when the graphical program is opened for editing, etc.

In various embodiments, the execution-time code that is programmatically generated or modified by the generation code may include code of any kind, and the code may be associated with the SDB node in any of various ways. In one embodiment, programmatically generating the execution-time code may comprise programmatically generating an execution-time block diagram or programmatically generating graphical execution-time code, wherein the execution-time block diagram or graphical code is associated with the SDB node in the graphical program. In another embodiment, programmatically generating the execution-time code may comprise programmatically generating text-based code.

In various embodiments, the generation code may also include code of any kind, and the code may be associated with the SDB node in any of various ways. In one embodiment, the generation code may include graphical code, e.g., the graphical code may be included in a block diagram. In another embodiment, the generation code may include text-based code.

In one embodiment, the SDB node may also include associated design-time behavior code operable to affect design-time behavior of the SDB node in various ways.

Once the graphical program has been created, the graphical program may be executed. Executing the graphical program may include executing the programmatically generated execution-time code associated with the SDB node. For example, when the SDB node is scheduled to execute, the programmatically generated execution-time code associated with the SDB node may execute to perform the function of the SDB node.

BRIEF DESCRIPTION OF THE DRAWINGS

A better understanding of the present invention can be obtained when the following detailed description of the preferred embodiment is considered in conjunction with the following drawings, in which.

Figure 1:
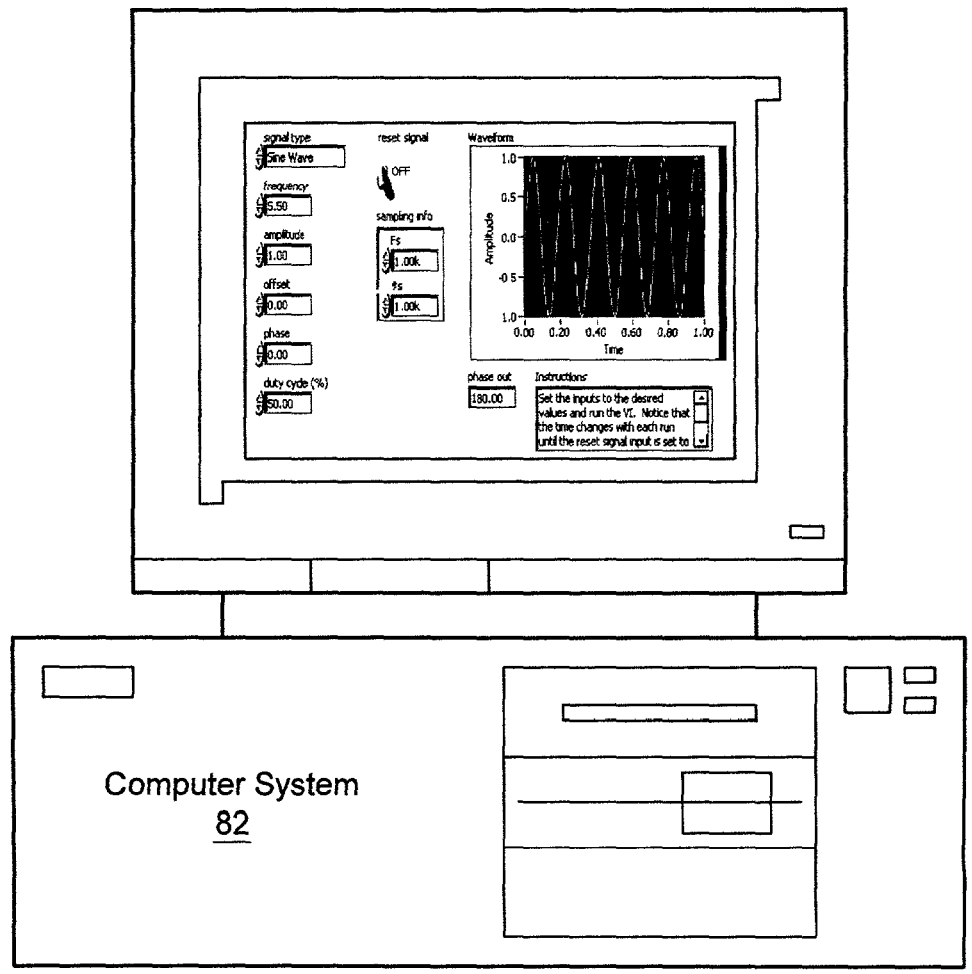
FIG. 1 illustrates a computer system operable to execute an application to create a self-defined behavior (SDB) node and/or operable to execute a graphical program that utilizes one or more SDB nodes.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/617,600 titled "Graphical Programming System with Distributed Block Diagram Execution and Front Panel Display," filed Jun. 13, 2000.

U.S. patent application Ser. No. 09/518,492 titled "System and Method for Programmatically Creating a Graphical Program," filed Mar. 3, 2000.

U.S. patent application Ser. No. 09/745,023 titled "System and Method for Programmatically Generating a Graphical Program in Response to Program Information," filed Dec. 20, 2000.

The LabVIEW and BridgeVIEW graphical programming manuals, including the "G Programming Reference Manual", available from National Instruments Corporation, are also hereby incorporated by reference in their entirety.

FIG. 1—Computer System

FIG. 1 illustrates a computer system 82. The computer system 82 may be operable to execute software, e.g., graphical programming development environment software, for creating a graphical program. The computer system 82 may also be operable to execute a graphical program created using such software. In various embodiments, the computer system 82 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

The graphical program created and/or executed by the computer system 82 may include one or more nodes referred to herein as "self-determining behavior (SDB) nodes". In one embodiment, an SDB node may have associated generation code. The generation code may be executed prior to execution of the graphical program. For example, the generation code may be executed at design-time of a graphical program that includes the SDB node and may programmatically generate execution-time code for the SDB node. For example, the generation code may be executed in response to various types of input received as the graphical program is being edited or in response to other events or information as described below. The generation code may be operable to generate different types of execution-time code for the SDB node, e.g., depending on particular input received or other factors. When the graphical program is executed, the programmatically generated execution-time code associated with the SDB node may be executed. Thus, the SDB node may have self-determining behavior in that the generation code associated with the SDB node may cause the SDB node to assume different execution-time behavior depending on various factors.

In another embodiment, the SDB node may alternatively or additionally have associated design-time behavior code. The design-time behavior code may be executed at design-time of a graphical program that includes the SDB node and may affect design-time behavior of the SDB node. For example, the design-time behavior code may affect the appearance of the SDB node within the graphical program or may affect other aspects of a user's experience of interacting with the SDB node when editing the graphical program.

Various embodiments of SDB nodes, methods to create an SDB node, and methods to create a graphical program utilizing an SDB node are described in more detail below.

As shown in FIG. 1, the computer system 82 may include a display device. The display device may display the graphical program as the graphical program is being created, modified and/or executed, e.g., may display a block diagram of the graphical program, wherein the block diagram displays a plurality of interconnected nodes visually indicating functionality of the graphical program. The display device may also be operable to display a graphical user interface or front panel of the graphical program during creation or execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium(s) may store graphical programming development environment software operable to create an SDB node and/or create graphical programs that utilize SDB nodes. Also, the memory medium may store one or more created graphical programs that utilize one or more SDB nodes. Also, the memory medium may store information representing one or more SDB nodes. The memory medium may also store operating system software, as well as other software for operation of the computer system.

As used herein, the term "memory medium" may include an installation medium, e.g., a CD-ROM, floppy disks 104, or tape device; a computer system memory or random access memory such as DRAM, SRAM, EDO RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

Examples of graphical program development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. In one embodiment, the system uses the LabVIEW graphical programming system available from National Instruments.

Figure 2A:
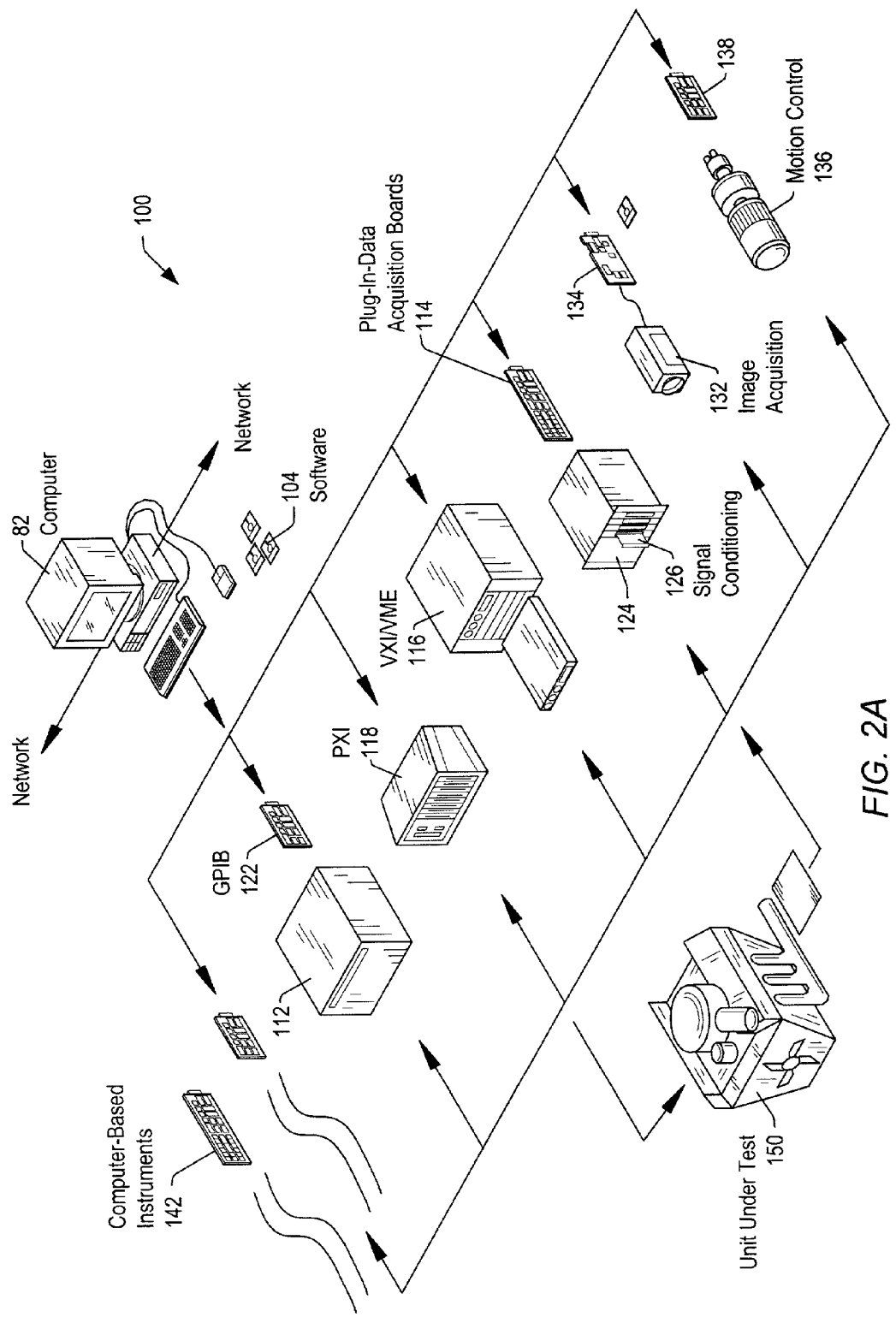
FIG. 2A illustrates an exemplary instrumentation control system.
Figure 2B:
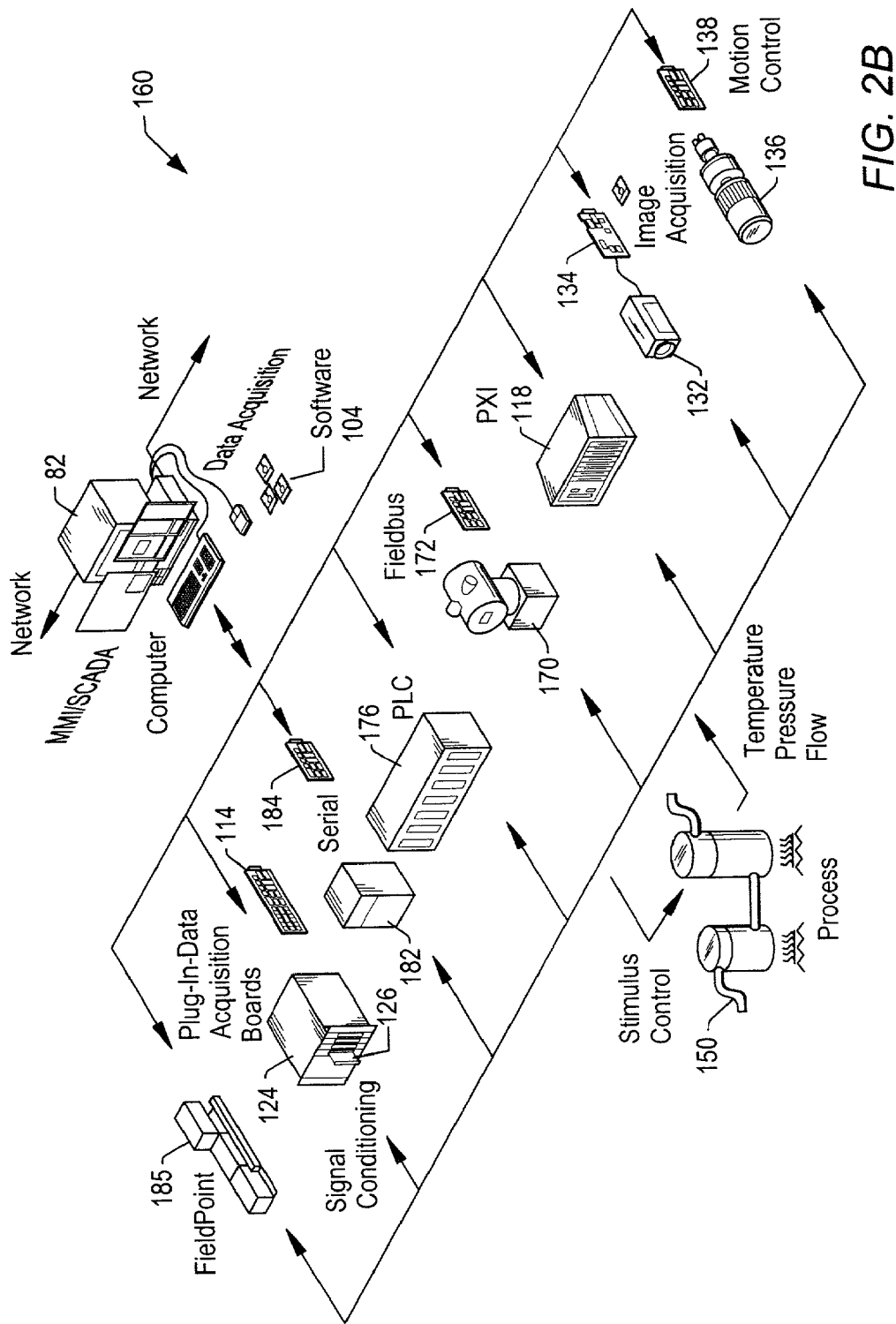
FIG. 2B illustrates an exemplary industrial automation system.

FIGS. 2A and 2B—Instrumentation and Industrial Automation Systems

The following describes embodiments of the present invention involved with performing test and/or measurement functions and/or controlling and/or modeling instrumentation or industrial automation hardware. However, it is noted that the present invention can be used for a plethora of applications and are not limited to instrumentation or industrial automation applications. In other words, the following description is exemplary only, and the present invention may be used in any of various types of systems. Thus, the system and method of the present invention is operable to be used in any of various types of applications, including but not limited to the control of other types of devices such as multimedia devices, video devices, audio devices, telephony devices, Internet devices, etc., as well as for general purpose software applications such as word processing, spreadsheets, network control, games, etc.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150. For example, the computer 82 may execute a graphical program that includes one or more SDB nodes, wherein the graphical program interacts with the one or more instruments. The graphical program may have been created on the computer system 82 or on another computer system.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The GPIB instrument 112 may be coupled to the computer 82 via the GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or MicroChannel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, a hardware-in-the-loop validation application, or other types of applications.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control. For example, the computer 82 may execute a graphical program that includes one or more SDB nodes, wherein the graphical program interacts with the one or more devices or instruments. The graphical program may have been created on the computer system 82 or on another computer system.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS-232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a computer system as shown in FIGS. 2A and 2B, traditional "stand-alone" instruments, as well as other types of measurement and control devices. The term "measurement function" may include any type of data acquisition, measurement or control function, such as that implemented by the instruments shown in FIGS. 2A and 2B. For example, the term "measurement function" includes acquisition and/or processing of an image. In one embodiment, a graphical program that utilizes an SDB node(s) may implement a measurement function. For example, the graphical program may be used to acquire a signal and perform the measurement function on the acquired signal.

In the embodiments of FIGS. 2A and 2B above, one or more of the various instruments may couple to the computer 82 over a network, such as the Internet. In one embodiment, the user operates to select a target instrument or device from a plurality of possible target devices for programming or configuration according to the present invention. Thus the user may create or deploy a graphical program on a computer and use the graphical program in conjunction with a target device or instrument that is remotely located from the computer and coupled to the computer through a network.

Graphical software programs which perform data acquisition, analysis and/or presentation, e.g., for measurement, instrumentation control, industrial automation, or simulation, such as in the applications shown in FIGS. 2A and 2B, may be referred to as virtual instruments.

Figure 3:
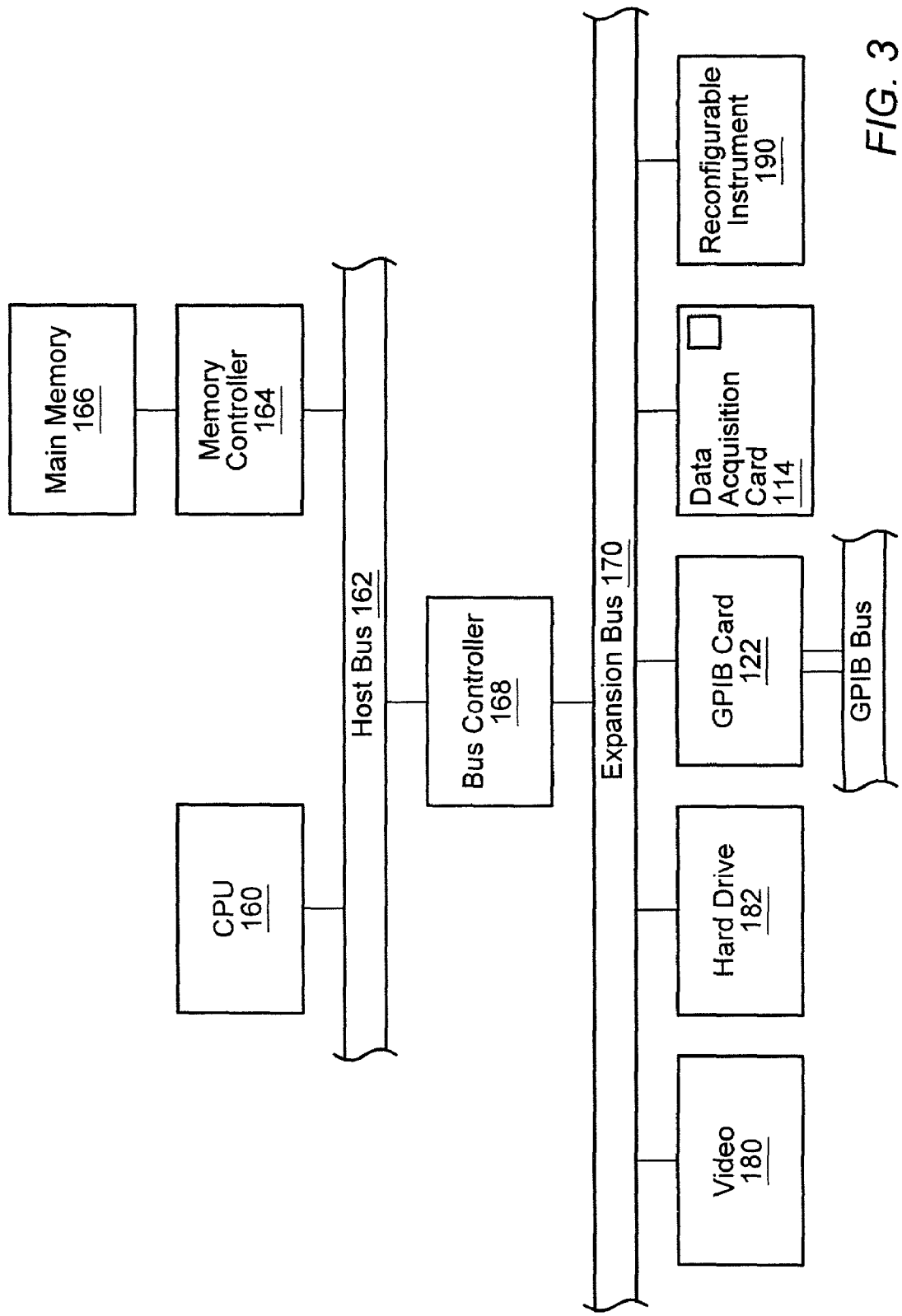
FIG. 3 is a block diagram representing one embodiment of the computer system illustrated in FIGS. 1, 2A or 2B.

FIG. 3—Computer System Block Diagram

FIG. 3 is a block diagram representing one embodiment of the computer system 82 illustrated in FIGS. 1, 2A or 2B. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments.

Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. In one embodiment, the main memory 166 may store graphical programming development environment software operable to create an SDB node and/or create graphical programs that utilize SDB nodes. In one embodiment, the memory medium may store a created graphical program that utilizes an SDB node. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170.

As shown, a reconfigurable instrument 190 may also be connected to the computer. The reconfigurable instrument 190 may include configurable logic, such as a programmable logic device, e.g., an FPGA, or a processor and memory, which may execute a real time operating system. According to one embodiment, a created graphical program that utilizes one or more SDB nodes may be deployed on the reconfigurable instrument 190. For example, a graphical programming development environment with which the graphical program is associated may provide support for configuring the reconfigurable instrument 190 to execute at least a portion of the graphical program. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 2A or 2B.

FIGS. 4–8: Self-Determining Behavior (SDB) Node

FIGS. 4–8 illustrate various exemplary embodiments of a self-determining behavior (SDB) node 200. The SDB node 200 may be a node for inclusion in a graphical program, e.g., for connection to other nodes in the graphical program. The SDB node 200 may have zero or more input terminals 202 to which inputs for the SDB node 200 may be connected. For example, the user may connect or wire an output terminal of another node in the graphical program to an input terminal 202 of the SDB node 200, or the user may connect other types of inputs to the input terminals, such as constant values. Also, the SDB node 200 may have zero or more output terminals 204 from which outputs produced or propagated by the SDB node 200 may be provided to other portions of the graphical program. For example, the user may connect or wire an output terminal of the SDB node 200 to an input terminal of another node in the graphical program or to another element of the graphical program.

Each node in a graphical program typically has associated execution-time code which is executed when the graphical program is executed (or which may execute, depending on dynamically determined factors such as conditions evaluated during execution of the graphical program). In other words, a node in a graphical program typically represents some functionality, and the execution-time code associated with the node executes during execution of the graphical program to perform this functionality. For example, as the graphical program is executed, nodes in the graphical program may be scheduled to execute, i.e., the execution-time code of these nodes may be scheduled to execute. The technique used to schedule the execution of the nodes may depend on the particular graphical programming development environment used to create the graphical program or the underlying implementation of the graphical program, such as whether the graphical program utilizes data flow, control flow, and/or execution flow. Block 210 in FIG. 4 illustrates the execution-time code associated with the SDB node 200.

Figure 4:
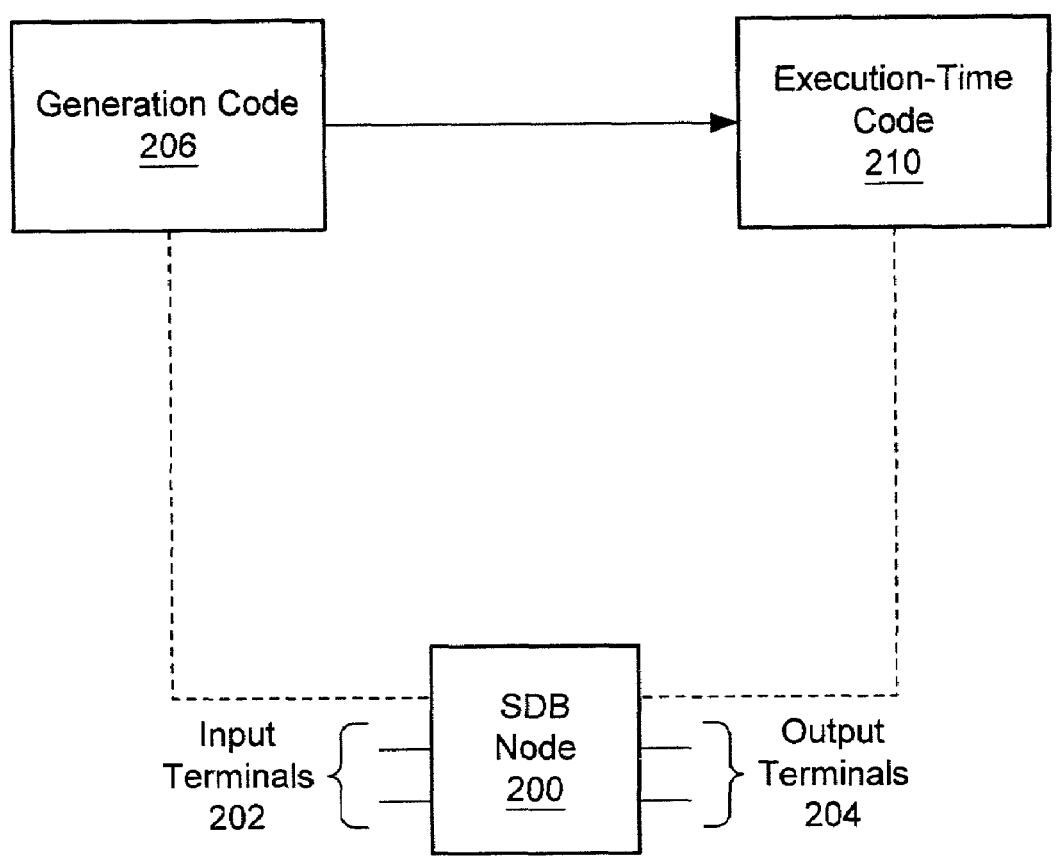
FIGS. 4–8 illustrate various exemplary embodiments of a self-determining behavior (SDB) node.

As shown in FIG. 4, the SDB node 200 may also have associated generation code 206. The generation code 206 may be operable to programmatically generate or modify the execution-time code 210. Programmatically generating or modifying the execution-time code 210 may include automatically generating or modifying the execution-time code without receiving user input during the generation or modification process. In one embodiment, when the SDB node 200 is initially displayed or included in a graphical program, the SDB node 200 may not yet have any execution-time code 210 or may have essentially empty or placeholder execution-time code 210. In this case, the generation code 206 may execute to programmatically or automatically generate the execution-time code 210 for the SDB node 200 after the SDB node 200 has been included in the graphical program. Thus, the execution functionality of the SDB node 200 may be determined by the execution-time code 210 generated by the generation code 206. In another embodiment, when the SDB node 200 is initially displayed or included in the graphical program, the SDB node 200 may have default execution-time code 210. In this case, the generation code 206 may execute to programmatically or automatically modify the execution-time code 210 or to re-generate the execution-time code 210.

The generation code 206 may be operable to programmatically generate different types of execution-time code 210 in response to or based on any of various factors. For example, the generated execution-time code 210 may have different functionality depending on these factors. In one embodiment, the actual execution-time code 210 that is generated, or the manner in which existing execution-time code 210 is modified, may depend on input received. For example, the generation may depend on user input received to edit the graphical program and/or user input received to a graphical programming development environment application used to create the graphical program. In other embodiments, the generation of the execution-time code 210 may depend on code generation dependency information, wherein the code generation dependency information may include information of any kind and from any source. Examples of various factors that may influence the generation of the execution-time code 210 are discussed in further detail below.

In various embodiments, the execution-time code 210 programmatically generated or modified by the generation code 206 may include code of any kind, and the code may be associated with the SDB node 200 in any of various ways. In one embodiment, the generated execution-time code 210 may include text-based code. In another embodiment, the generated execution-time code 210 may include graphical code, wherein the graphical code may include a plurality of interconnected nodes which, when displayed, visually indicate functionality of the execution-time code 210. For example, generating the execution-time code 210 may include generating an execution-time block diagram associated with the SDB node 200. Thus, a block diagram specifying execution functionality of the SDB node 200 may be programmatically or automatically generated. The resulting block diagram may be a block diagram much the same as a block diagram manually created by a user. For example, many graphical programming development environments enable a user to create a sub-program node and create a block diagram or graphical code specifying execution functionality of the sub-program node. In one embodiment, the programmatically generated block diagram may itself include one or more instances of an SDB node, e.g., instances of the SDB node that generated the block diagram and/or instances of other SDB nodes.

In one embodiment, the generated execution-time code 210 may subsequently be converted to another form before being executed, such as machine language code. In another embodiment, machine language code may be directly generated.

In one embodiment, the generated execution-time code 210 may be displayed to the user, either automatically or in response to a user request to view the code. In another embodiment, the graphical programming development environment may not allow the user to view the generated execution-time code 210 associated with an SDB node 200.

In various embodiments, the generation code 206 may also include code of any kind, and the code may be associated with the SDB node 200 in any of various ways. In one embodiment, the generation code 206 may include text-based code. In another embodiment, the generation code 206 may include graphical code, wherein the graphical code may include a plurality of interconnected nodes which, when displayed, visually indicate functionality of the generation code 206. For example, the generation code 206 may be included on a block diagram, referred to herein as a node behavior characterization block diagram. Thus, in one embodiment, in addition to having an associated execution-time block diagram, the SDB node 200 may also have a node behavior characterization block diagram. The node behavior characterization block diagram may include the generation code 206, which may be operable to programmatically generate the execution-time block diagram. However, while the execution-time block diagram may execute during execution of the graphical program, the node behavior characterization block diagram may execute at design-time of the graphical program, e.g., as the graphical program is being edited. In one embodiment, the node behavior characterization block diagram may itself include one or more instances of an SDB node.

Figure 5:
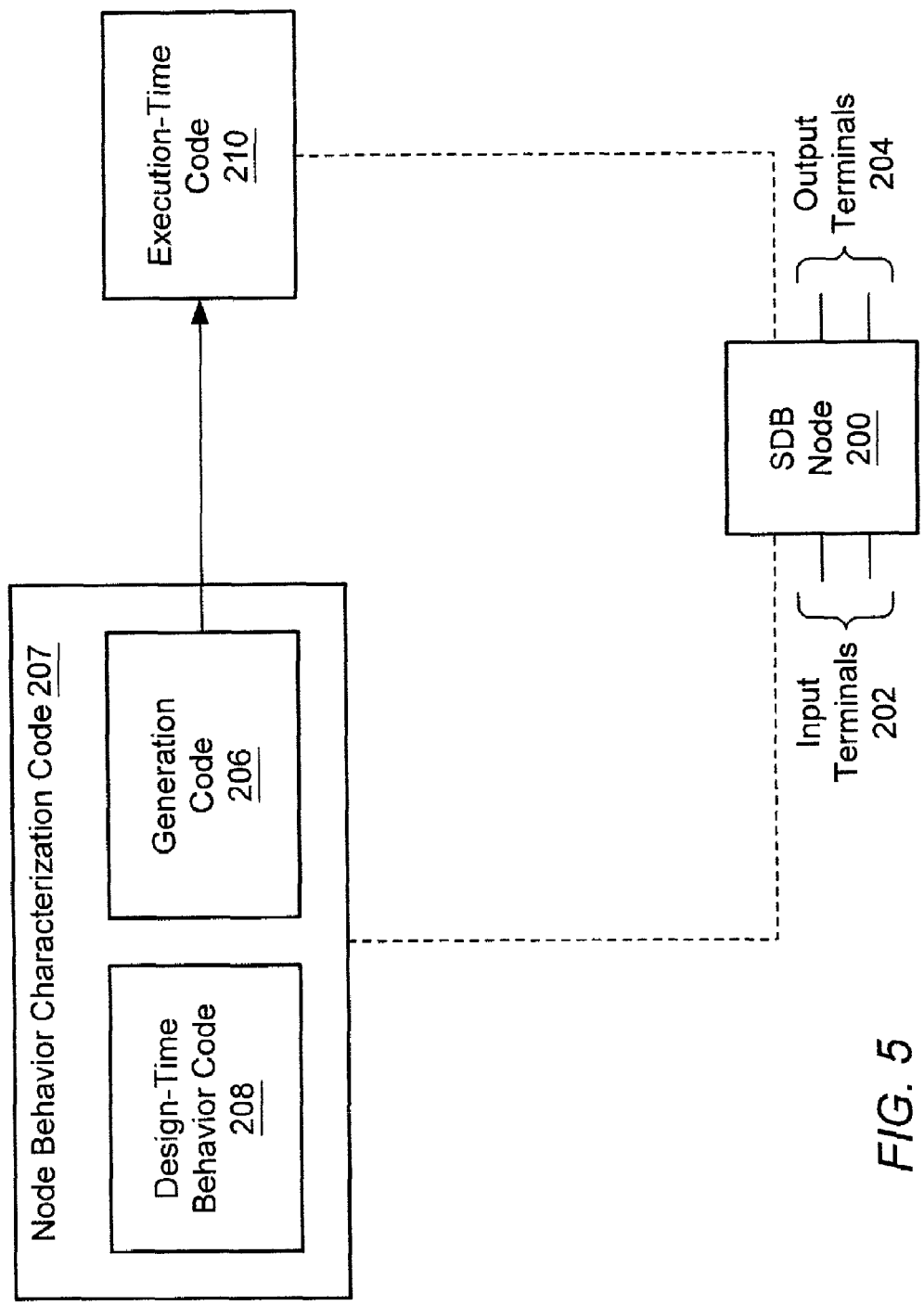

As shown in FIG. 5, in one embodiment, the SDB node 200 may also have design-time behavior code 208. The design-time behavior code 208 may be operable to affect design-time behavior of the SDB node 200. As used herein, the term "design-time" may refer to states when a graphical program including the SDB node 200 is not being executed. For example, design-time may include a state in which the graphical program is currently being edited, such as when the graphical programming development environment is currently displaying a main block diagram of the graphical program and is ready to receive user input specifying edits to the main block diagram. Design-time may also include other states in which the graphical program is not being edited per se. For example, design-time may include a state in which the graphical programming development environment has been launched, but the graphical program itself has not been opened for editing and is not being executed. The term "edit-time" may refer to a state in which the graphical program is currently being edited. For example, edit-time may include a state in which the graphical programming development environment is receiving or is ready to receive user input to edit or create the graphical program.

In various embodiments, the design-time behavior code 208 may affect any of various aspects of the design-time behavior of the SDB node 200. For example, the design-time behavior code 208 may affect a user's experience of interacting with the SDB node 200 when editing the graphical program. The design-time behavior code 208 may execute in response to any of various conditions or events. In one embodiment, the design-time behavior code 208 may execute in response to user input received, such as user input to edit the graphical program. Various examples of actions which may be performed by the design-time behavior code 208 and conditions which may cause the design-time behavior code 208 to execute are described below.

Similarly as described above with respect to the generation code 206, the design-time behavior code 208 may include any of various types of code, such as graphical code and/or text-based code. Also, in various implementations, the design-time behavior code 208 may be associated with the SDB node 200 in any of various ways.

As shown in FIG. 5, in one embodiment the design-time behavior code 208 may be packaged together with the generation code 206. In this case, the design-time behavior code 208 and the generation code 206 may together be referred to as node behavior characterization code 207. For example, in one embodiment the design-time behavior code 208 may include graphical code, and the generation code 206 may include graphical code, and both the design-time behavior graphical code and the execution-time generation graphical code may be included in a common node behavior characterization block diagram. In another embodiment, the design-time behavior code 208 and the generation code 206 may each include text-based code that is packaged together, such as in a common software component.

Figure 6:
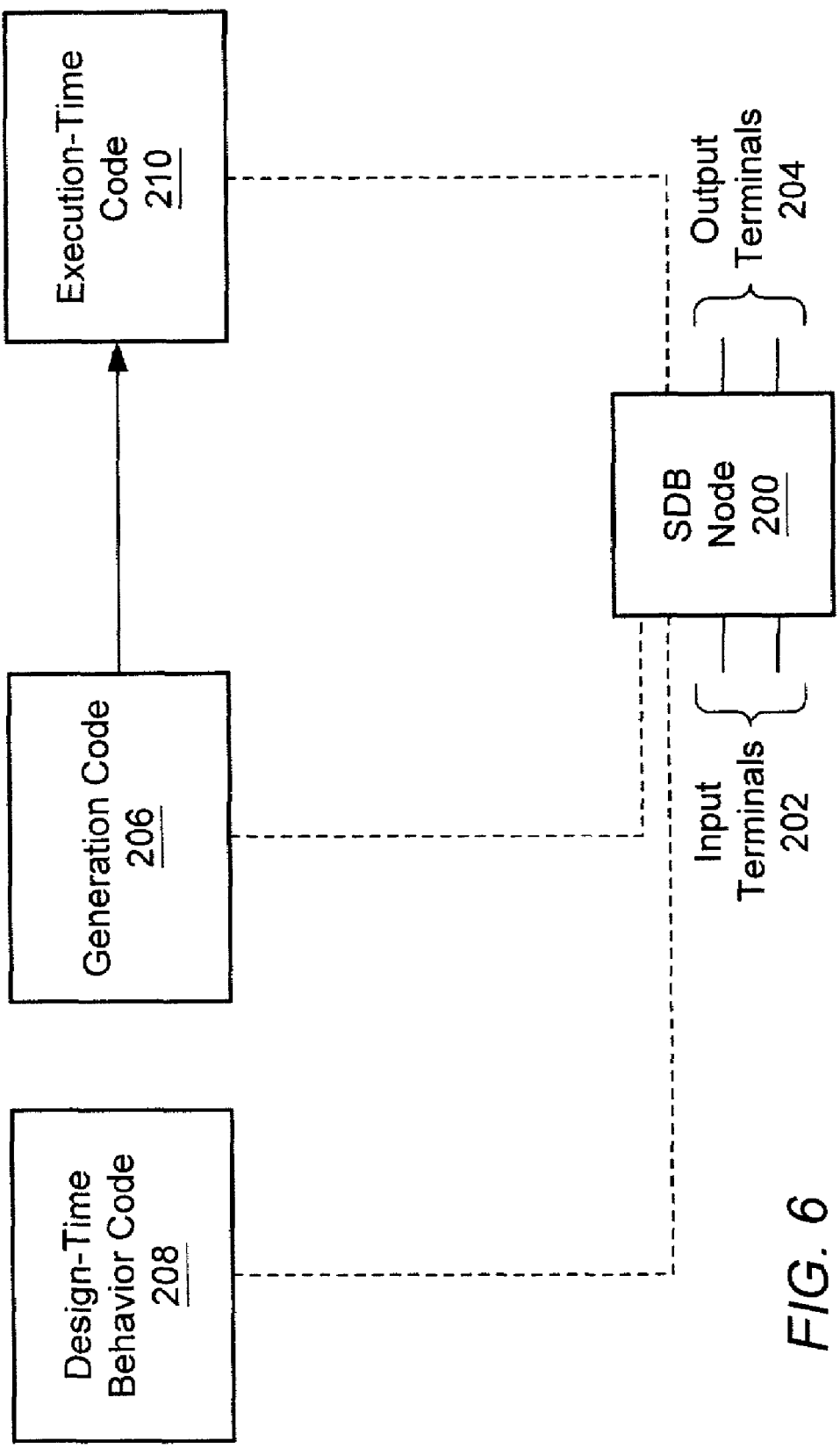

In another embodiment, the design-time behavior code 208 may be largely separate from the generation code 206, as shown in FIG. 6. For example, the design-time behavior code 208 and the generation code 206 may each include graphical code, but the respective graphical code may be located in separate block diagrams. As another example, separate software components may implement the design-time behavior code 208 and the generation code 206, or the respective code may be modularly separate.

It is noted that in another embodiments, the SDB node 200 may have associated generation code 206 but may not have associated design-time behavior code 208, or vice versa.

Figure 7:
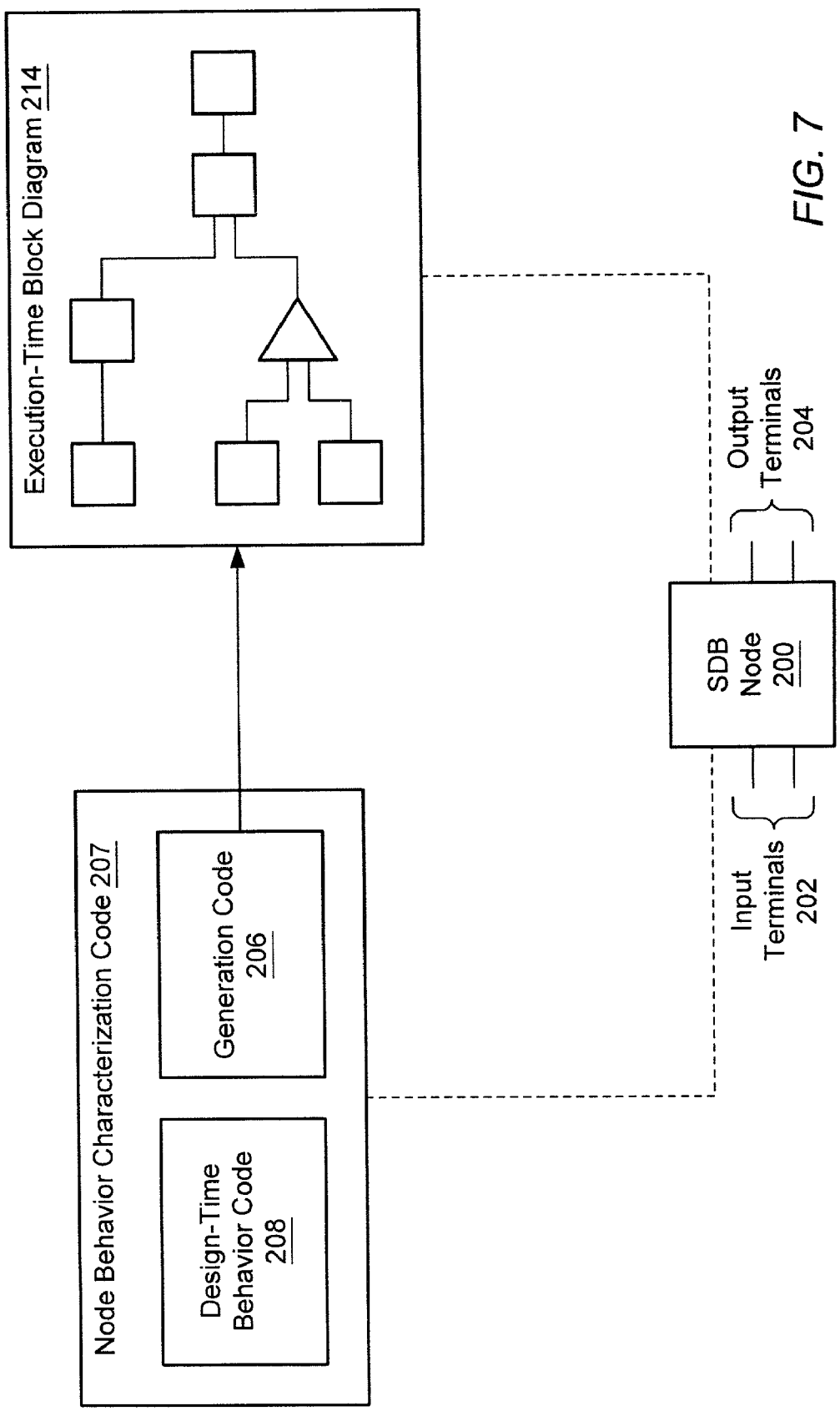

FIG. 7 illustrates an embodiment in which the execution-time code 210 includes graphical code located in an execution-time block diagram 214, similarly as described above. The illustration of the execution-time block diagram 214 shows an arbitrary example of a plurality of interconnected nodes representing the execution-time code 210.

Figure 8:
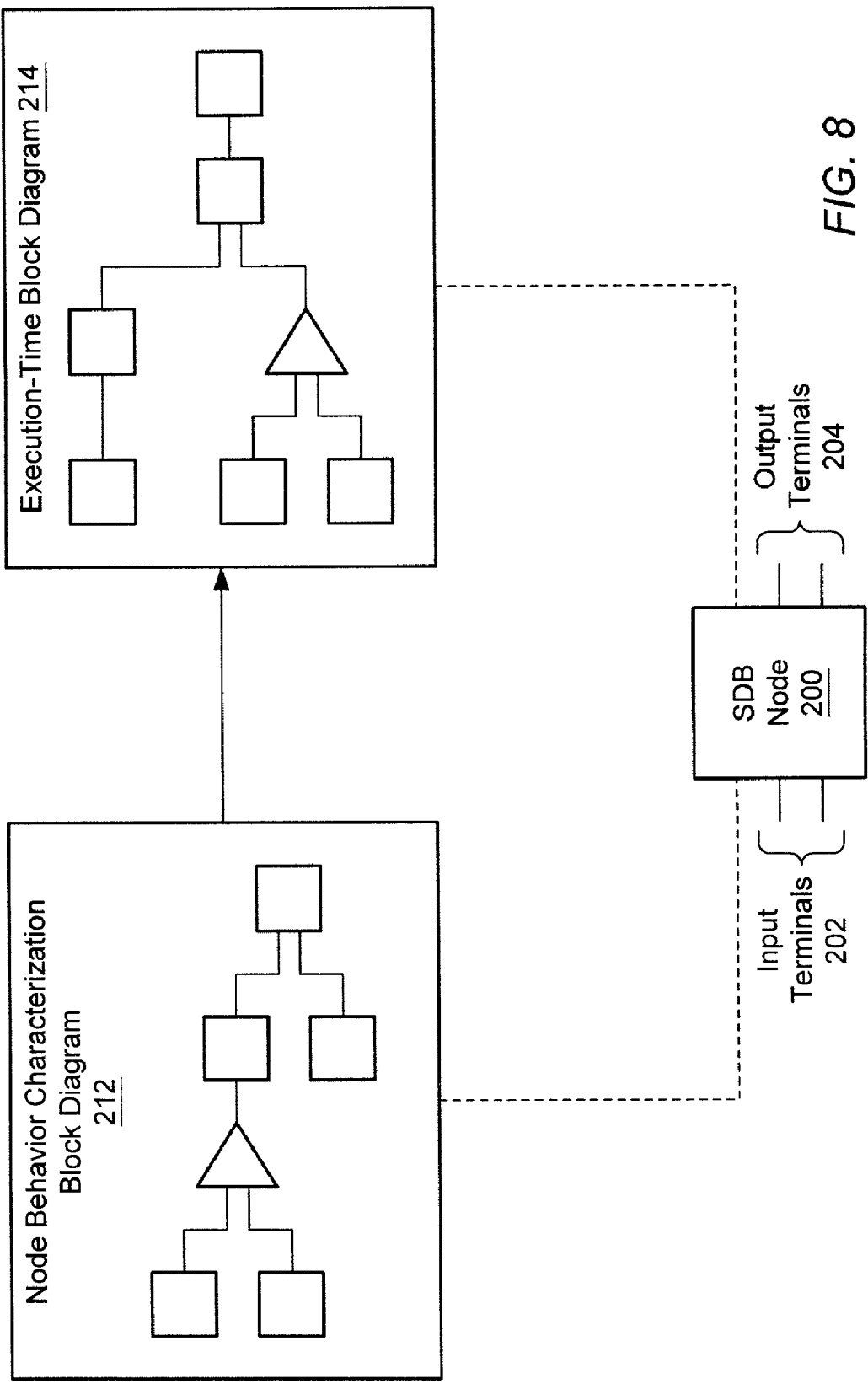

FIG. 8 illustrates an embodiment in which both an execution-time block diagram 214 and a node behavior characterization block diagram 212 are associated with the SDB node 200, similarly as described above. The illustration of the node behavior characterization block diagram 212 shows an arbitrary example of a plurality of interconnected nodes representing the generation code 206 and/or the design-time behavior code 208.

Figure 9:
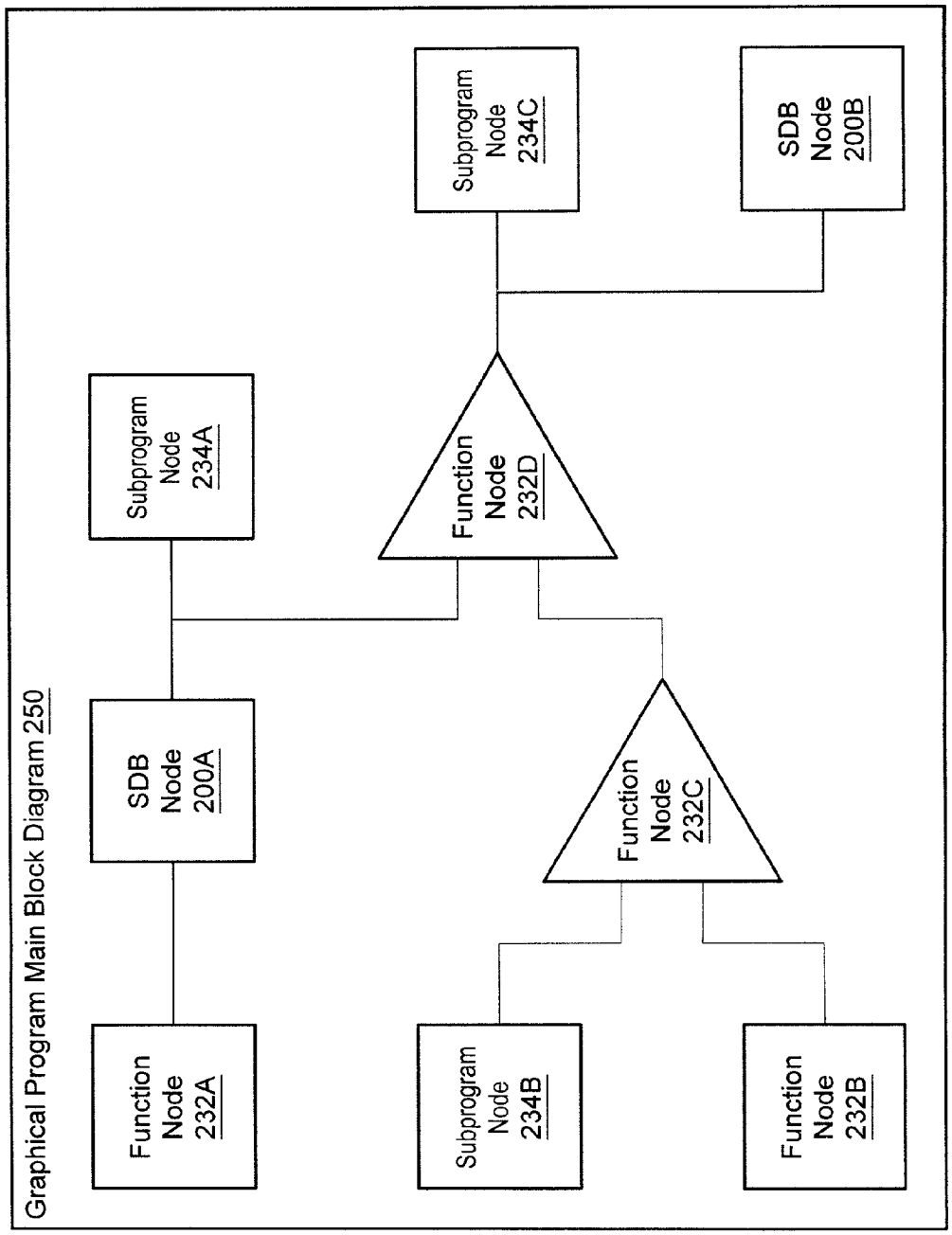
FIG. 9 illustrates an example of a graphical program that includes two self-determining behavior (SDB) nodes.

FIG. 9—SDB Node Included in a Graphical Program

FIG. 9 illustrates an example of a graphical program that includes two self-determining behavior (SDB) nodes 200. For example, the SDB nodes 200 may be included in a main or top-level block diagram of the graphical program. As shown, the graphical program may include various types of nodes such as function nodes 232, subprogram nodes 234, and the SDB nodes 200. In the example of FIG. 9, the particular arrangement of nodes and the interconnections among them is arbitrary and for illustrative purposes. An actual block diagram may be more complex and may include any of various other types of nodes or other elements, such as programmatic structures, e.g., loops, case structures, sequence structures, user interface terminals, etc. Also, the nodes in FIG. 9 are blank and simply labeled with the type of node, but the nodes in an actual block diagram may have an iconic appearance, e.g., to visually indicate the functionality provided by each node.

In various embodiments, any number of SDB nodes 200 may be present in the graphical program. FIG. 9 illustrates two SDB nodes, 200A and 200B. In one embodiment, both nodes of these nodes may be instances of a particular SDB node. In other words, the user may have included the particular SDB node twice in the graphical program. In this case, the SDB node 200A and the SDB node 200B may have associated generation code 206 which is identical. However, since the generation code 206 may be operable to generate execution-time code 210 for the respective nodes differently depending on various factors, the execution-time code 210 associated with each of the two nodes may be different. As one simple example, the generation code 206 may be operable to generate different execution-time code 210 depending on the data type of an input connected to the respective SDB node. SDB node 200A receives an input from function node 232A, and SDB node 200B receives an input from function node 232D. If the outputs of function nodes 232A and 232D have different data types, then different execution-time code 210 may be generated for the respective SDB nodes 200A and 200B.

In another embodiment, the SDB nodes 200A and 200B may not be instances of the same SDB node 200. Any of various kinds of SDB nodes may be made available for inclusion in a graphical program. Thus, the generation code 206 associated with the SDB nodes 200A and 200B may be different. For example, the intended purpose of or type of functionality provided by each of the two SDB nodes may be substantially different.

In addition to the SDB nodes 200, FIG. 9 illustrates function nodes 232 and subprogram nodes 234. The function nodes 232 may be primitive nodes provided by the graphical programming development environment. The function nodes 232 may have associated execution-time code, but may not have associated block diagrams, i.e., the execution-time functionality of the function nodes 232 may be implemented using techniques other than graphical programming techniques.

The subprogram nodes 234, on the other hand, may have associated block diagrams. For example, the graphical programming development environment may enables users to create a custom subprogram node and create a block diagram to specify execution-time functionality of the subprogram node. Also, various subprogram nodes may be provided by the graphical programming development environment itself for inclusion in graphical programs, e.g., these subprogram nodes may come with the graphical programming development environment when it is installed. Thus, there may be a hierarchy of block diagrams in a graphical program, e.g., a main or top-level block diagram, as well as block diagrams of subprogram nodes, which may in turn include other subprogram nodes having block diagrams, etc.

In one embodiment, an SDB node 200 may be included in the block diagram of a subprogram node. For example, instead of illustrating the main or top-level block diagram of a graphical program, FIG. 9 may illustrate the block diagram of a subprogram node.

Figure 10:
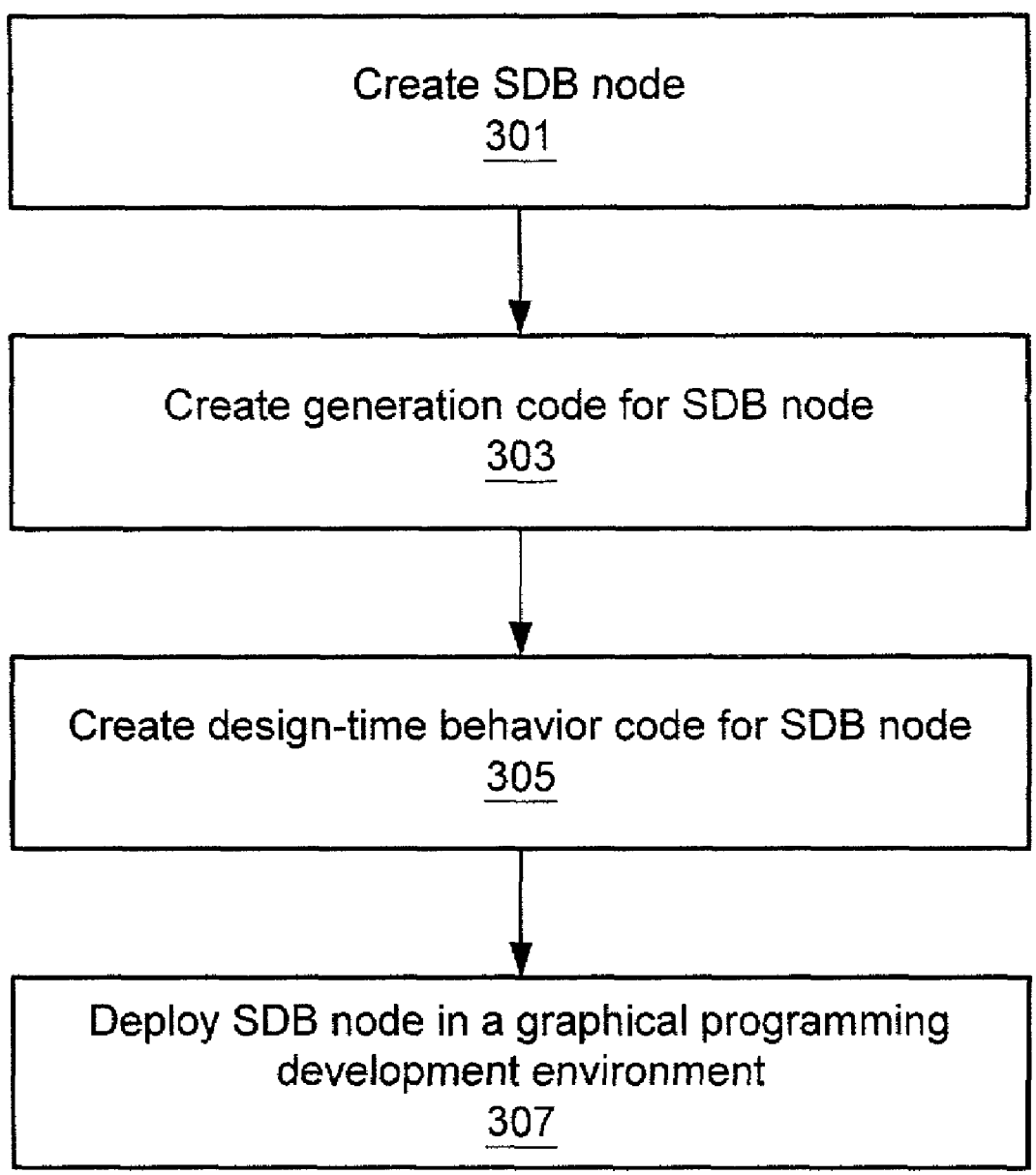
FIG. 10 is a flowchart diagram illustrating one embodiment of a method for creating a self-determining behavior (SDB) node.

FIG. 10—Creating an SDB Node

FIG. 10 is a flowchart diagram illustrating one embodiment of a method for creating a self-determining behavior (SDB) node. It is noted that FIG. 10 illustrates a representative embodiment, and alternative embodiments are contemplated. Also, various steps may be combined, omitted, or performed in different orders, etc.

In 301, the SDB node may be initially created. For example, the user may request a graphical programming development environment to create an initial or default SDB node, e.g., by utilizing a menu command or providing other input to the graphical programming development environment. In response, the graphical programming development environment may create or store initial or default data structures representing the SDB node. The data structures may include a default icon for display when the SDB node is included in a graphical program. The user may later specify another iconic appearance that better indicates the functionality of the SDB node.

In 303, generation code associated with the SDB node may be created, e.g., in response to user input. The user may specify generation code operable to programmatically generate desired execution-time code for the SDB node. As described below, the generation code may be operable to generate the execution-time code in response to or based on various types of input, events, or conditions. Also, the generation code may be operable to determine various types of code generation dependency information that affects the generation of the execution-time code.

As described above, the generation code may include code of any kind, including graphical code, text-based code, or other types of code, and the code may be associated with the SDB node in any of various ways. In one embodiment, a graphical user interface for specifying the generation code may be displayed, and the user may interact with this graphical user interface to specify the generation code. For example, in one embodiment, the generation code may include graphical code located in a block diagram. Thus, for example, a graphical user interface, e.g., a panel or window, for creating the block diagram may be displayed. The user may interact with the graphical user interface to specify the inclusion of various nodes or other elements in the block diagram, specify interconnections among the nodes, configure properties or parameters of the nodes, etc.

In another embodiment, the generation code may include text-based code. Thus, 303 may include creating or filling in one or more functions, methods, or other procedures with text-based code operable to programmatically generate execution-time code for the SDB node when executed.

In 305, design-time behavior code associated with the SDB node may be created, e.g., in response to user input. The user may specify design-time behavior code operable to affect various aspects of design-time behavior of the SDB node. Various examples of design-time behavior are discussed below. The design-time behavior code may be operable to affect design-time behavior of the SDB node in response to or based on various types of input, events, or conditions. In one embodiment, the design-time behavior code may execute in response to user input received, such as user input to edit a graphical program in which the SDB node has been included.

Similarly as described above, the design-time behavior code may include code of any kind, including graphical code, text-based code, or other types of code, and the code may be associated with the SDB node in any of various ways. For example, in one embodiment, the design-time behavior code may include graphical code located in a block diagram. Thus, graphical design-time behavior code may be included in the block diagram. In another embodiment, the design-time behavior code may include text-based code.

As described above, in one embodiment, the design-time behavior code may be packaged together with the generation code. For example, the design-time behavior code and the generation code may each include graphical code located within a common node behavior characterization block diagram. Thus, 303 and 305 may be combined. Also, in one embodiment, the SDB node may not have associated generation code or may not have associated design-time behavior code, and thus 303 or 305 may not be performed. Also, in one embodiment, the generation code and/or the design-time behavior code may be pre-existing before the SDB node is created or may be created using an application other than an application used to create the SDB node. Thus, 303 and/or 305 may comprise supplying a reference to such code.

The initial or default data structures representing the SDB node may be updated to include or reference the created generation code and design-time behavior code. Data structures and/or program instructions representing the SDB node may be stored, e.g., may be persistently stored on a memory medium. Storing the SDB node may include storing the generation code and design-time behavior code with the SDB node. In one embodiment, the generation code and/or the design-time behavior code may be converted to another format, which may also be stored.

In one embodiment, creating the SDB node may also comprise specifying an interface for connecting the SDB node to other nodes in a block diagram, e.g., by specifying one or more input and/or output terminals for the SDB node. During execution of the graphical program, the execution-time code of the SDB node may utilize inputs connected to the input terminals.

As indicated at 307, in one embodiment the created SDB node may be deployed in a graphical programming development environment. Deploying the SDB node in the graphical programming development environment may include enabling the graphical programming development environment to allow users to include the SDB node in graphical programs created using the graphical programming development environment. For example, the SDB node may be created using an application, e.g., a graphical programming development environment application, installed on a first computer system. One or more files representing the SDB node may then be stored on a second computer system (or a memory medium accessible from the second computer system), such that when a graphical programming development environment installed on the second computer system is executed to create or edit a graphical program, the graphical programming development environment allows a user to include the SDB node in the graphical program. For example, the SDB node may appear or be listed in a palette or library of nodes available for inclusion, or the user may be able to select one or more files representing the SDB node to request the SDB node to be included.

Thus, for example, an SDB node may be created by a first user and then deployed in a graphical programming development environment on a second user's computer system. The second user may then create a graphical program that uses the SDB node created by the first user. For example, the first "user" may be the vendor of the second user's graphical programming development environment. Thus, the SDB node may be installed along with the graphical programming development environment on the second user's computer system, or may be deployed in the graphical programming development environment at a later date. Also, the first user may be a third-party developer who creates a library of graphical program nodes to provide additional functionality.

In another embodiment, the same user who creates an SDB node may also create a graphical program that uses the SDB node. Thus, it may not be necessary to perform 307 since the SDB node may already be accessible from the user's graphical programming development environment.

Figure 11:
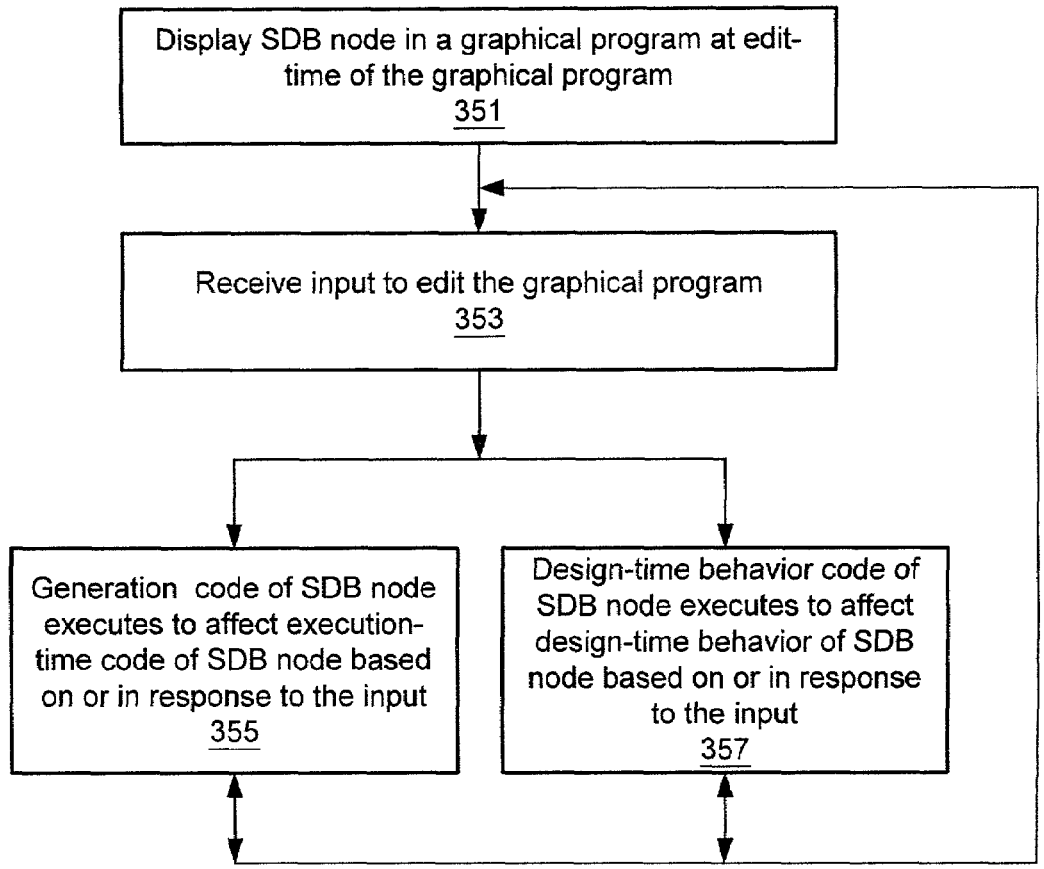
FIG. 11 is a flowchart diagram illustrating one embodiment of a method for creating a graphical program that utilizes a self-determining behavior (SDB) node.

FIG. 11—Creating a Graphical Program that Utilizes an SDB Node

FIG. 11 is a flowchart diagram illustrating one embodiment of a method for creating a graphical program that utilizes a self-determining behavior (SDB) node. It is noted that FIG. 11 illustrates a representative embodiment, and alternative embodiments are contemplated. Also, various steps may be combined, omitted, or performed in different orders.

In 351, an SDB node may be displayed in a graphical program at edit-time of the graphical program, i.e., as the graphical program is being created or edited. For example, the SDB node may be displayed in a block diagram of the graphical program in response to a user requesting to include the SDB node in the block diagram. As described above with reference to FIG. 9, the SDB node may be one of a plurality of nodes in the block diagram. The graphical program or block diagram may be created or assembled by the user arranging on the display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons that visually indicate the functionality of the program. As described above, a user interface or front panel for the graphical program may also be created, e.g., in response to user input.

In 353, input to edit the graphical program may be received. Based on the input received and/or in response to the input received, the generation code of the SDB node may execute in 355 to programmatically generate or affect execution-time code of the SDB node, and/or design-time behavior code of the SDB node may execute in 357 to affect design-time behavior of the SDB node.

The generation of the execution-time code of the SDB node may be performed based on or in response to any of various kinds of input received in 353. In one embodiment, the input may comprise input to a block diagram of the graphical program. For example, the input may be received in the process of creating the plurality of interconnected nodes as described above.

As one example, the input received in 353 may include input specifying the connection of one or more inputs to input terminals of the SDB node. For example, the generation code of the SDB node may be operable to programmatically generate execution-time code based on data types of the inputs. For example, the generation code may enable the SDB node to exhibit polymorphic behavior, as discussed in more detail below. Also, the execution-time code may be programmatically generated based on one or more values of the connected inputs. For example, if a constant integer input value within a first range is connected to the SDB node, first execution-time code may be generated, wherein the first execution-time code has first functionality, and if a constant integer input value within a second range is connected to the SDB node, second execution-time code may be generated, wherein the second execution-time code has second functionality.

As another example, the execution-time code may be generated based on which particular subset of inputs are connected to the SDB node. The SDB node may have a plurality of input terminals, but the user may not be required to connect inputs to all of the terminals. As a simple example, consider an SDB node having a first input terminal, wherein an input connected to the first input terminal may affect execution behavior of the SDB node, or there may be no effect on the execution behavior of the SDB node if no input is connected to the first input terminal. Thus, if no input is connected to the first input terminal, then the generation code may programmatically generate execution-time code for the SDB node that does not include logic for checking the value of an input connected to the first input terminal and responding to the input value. This may result in the execution-time code being smaller and more efficient.

In a case in which the execution-time code is generated based on which particular subset of inputs are connected to the SDB node, it may be difficult to know at edit-time which inputs will eventually be connected to the SDB node. In one embodiment, the generation code may execute each time the subset of connected inputs changes and may interactively re-generate or modify the execution-time code each time based on the connected inputs. In another embodiment, it may be desirable to generate the execution-time code a single time, e.g., after the user has finished editing the graphical program. For example, the generation code associated with the SDB node may be executed to generate the execution-time code when the graphical program is compiled or just prior to execution of the graphical program. Thus, in various embodiments, the generation code may execute to generate execution-time code for the SDB node based on input received to edit the graphical program, but may not execute immediately in response to the input.

As another example, the execution-time code may be generated based on which other nodes the user includes in the graphical program or based on the configuration of other nodes in the graphical program. As a simple example, consider an SDB node designed to analyze data acquired from an acquisition node, wherein the acquisition node is configurable to acquire data from different types of sources. It may be desirable to analyze the data differently, depending on the source type from which the data is acquired. For example, if the user configures the acquisition node to acquire data from a first source type, the generation code of the SDB node may execute to generate first execution-time code having first functionality, and if the user configures the acquisition node to acquire data from a second source type, the generation code of the SDB node may execute to generate second execution-time code having second functionality, wherein the first functionality is different than the second functionality.

In various embodiments, the execution-time code for the SDB node may be generated or modified based on or in response to user input received to configure the SDB node in the graphical program. The SDB node may be able to take on different functionality in the graphical program, depending on configuration user input received. For example, the node may be generally related to a particular functional realm, such as data acquisition, signal analysis, data display, network communications, etc. However, until configuration user input is received for the node, the exact execution-time behavior of the node within the graphical program may be undefined.

In one embodiment, the SDB node may have a configuration user interface for configuring the SDB node, e.g., for specifying desired execution-time functionality of the SDB node. For example, the configuration user interface may include one or more graphical panels or windows. The configuration user interface may comprise information useable in guiding the user to specify desired functionality for the SDB node. The SDB node may be configured to perform a variety of functions within the graphical program, depending on user input received to the configuration user interface. As noted above, the node may be generally related to a particular functional realm, such as data acquisition, signal analysis, data display, etc. Thus, the configuration user interface may display information related to the particular functional realm. For example, for an SDB node related to network communications, the configuration user interface may include GUI controls for specifying a data source or target to which to connect when the SDB node is executed, specify a connection protocol to use, etc.

Thus, in one embodiment, creating the SDB node as described above may also include creating a configuration user interface for the SDB node. After the SDB node has been included in the graphical program, the user may invoke the configuration user interface to configure the SDB node, e.g., by double-clicking on the SDB node, selecting a menu option to request to configure the SDB node, or in any of various other ways.

Thus, in one embodiment an SDB node may be configured to perform a plurality of operations, depending on user input specifying configuration information for the SDB node. The configuration user interface may enable the user to specify one or more desired operations for the SDB node from the plurality of possible operations. However, since the execution-time code associated with the SDB node may be generated programmatically, a "minimal" amount of execution-time code may be generated, i.e., only code necessary to implement the one or more specified operations may be generated. Thus, code corresponding to operations from the plurality of operations that are not among the one or more specified operations may not be included in the graphical program. Associating a minimal amount of execution-time code with a node in a graphical program node in this way may be advantageous in some situations, e.g., by reducing the size of the graphical program.

In various other embodiments, the execution-time code for the SDB node may be generated based on any of various other kinds of input to edit the graphical program. For example, in one embodiment, the generation code may be operable to generate the execution-time code in response to displaying the SDB node in the graphical program in 351. In another embodiment, receiving input to edit the graphical program in 353 may include receiving input to edit a user interface or front panel of the graphical program, and the execution-time code may be programmatically generated based on this input.

Referring again to FIG. 11, 357 illustrates that in one embodiment, design-time behavior code of the SDB node may execute to affect design-time behavior of the SDB node based on or in response to the input received to edit the graphical program. In various embodiments, the design-time behavior code may affect any of various aspects of the design-time behavior of the SDB node. For example, the design-time behavior code may affect a user's experience of interacting with or viewing the SDB node when editing the graphical program. In one embodiment, the design-time behavior code may execute in response to user input received to a block diagram of the graphical program. For example, the user input may be received in the process of creating the plurality of interconnected nodes as described above.

In some embodiments, the user input may be received to the SDB node itself. For example, user input to the SDB node may include: selecting the SDB node; clicking on the SDB node (e.g., left-clicking, right-clicking, or double-clicking); re-sizing the SDB node; moving the SDB node to another location within the block diagram; moving a mouse cursor over the SDB node; etc.

As one example, the design-time behavior code of the SDB node may be operable to display a custom context menu or popup menu for the SDB node, e.g., in response to the user right-clicking on the SDB node. For example, the context menu may include items operable to invoke a user interface to configure the SDB node or checkable Boolean items indicating desired properties of the SDB node. For example, these properties may affect the generation of the execution-time code for the SDB node. The menu items may also allow the user to specify desired edit-time behavior of the SDB node, e.g., whether to dynamically change the input/output terminals of the SDB node as described below.

As another example, the design-time behavior code may be operable to change the number of input/output terminals of the SDB node and/or may affect the terminal names. For example, after the user has configured the SDB node using a configuration user interface such as described above, some of the possible input/output terminals may not be applicable. Thus, the design-time behavior code may execute to dynamically display only relevant terminals. For example, before the user configures the SDB node, a first output terminal may be displayed. If the first output terminal is no longer relevant after the user configures the SDB node, the design-time behavior code may cause this terminal to be hidden. Similarly, if a first input terminal is hidden before the user configures the SDB node, the design-time behavior code may cause the first input terminal to be displayed after the user configures the SDB node if the new configuration requires input to this terminal or makes the terminal relevant.

The terminals of the SDB node may also be affected depending on any of various other kinds of input. For example, if the user connects an input of a first data type to a first input terminal that makes a second input terminal irrelevant, then the second input terminal may be hidden. As another example, if the user connects an input of a first data type to a first input terminal, then a displayed name for the first input terminal or for another terminal may be changed, e.g., to more precisely indicate the purpose of the terminal.

As another example, the design-time behavior code may be operable to change the iconic appearance of the SDB node within the graphical program. For example, the SDB node may have a default icon, and the design-time behavior code may dynamically change the icon depending on how the SDB node has been configured within the graphical program, e.g., depending on input received to a configuration user interface, depending on inputs connected to the SDB node, depending on which nodes the SDB node provides outputs to, etc. As an example, consider a polymorphic SDB node operable to perform a polymorphic operation on two inputs. The icon for the SDB node may be dynamically changed depending on the data types of inputs the user connects to the SDB node, e.g., to more descriptively represent the operation of the SDB node. The new icon may take on any of various shapes or sizes. For example, most nodes in the graphical program may be displayed using an icon of a fixed size, e.g., 32×32 pixels. However, the SDB node may be represented using a larger or smaller icon, as appropriate.

As another example, the design-time behavior code may be operable to affect the SDB node's behavior in response to the user moving a mouse cursor over the SDB node. For example, the design-time behavior code may display an informative message which may vary depending on the current configuration of the node. As another example, if some of the SDB node's input/output terminals have been hidden as described above, then the design-time behavior code may cause all of the terminals to be temporarily displayed while the mouse cursor is located over the SDB node.

In one embodiment, both the generation code and the design-time behavior code may execute in response to a given input to edit the graphical program. As one example, in response to receiving input via a configuration user interface to configure the SDB node, the generation code may execute to generate execution-time code based on the specified configuration, and the design-time behavior code may execute to cause a descriptive icon to be displayed based on the specified configuration. In other embodiments, the generation code may execute in response to a given input, but the design-time behavior code may not execute, or vice versa.

Referring again to FIG. 11, the arrows returning from 355 and 357 to 353 indicate that 353, 355, and 357 may be performed repeatedly.

It is noted that FIG. 11 represents one embodiment of a method for creating a graphical program that utilizes an SDB node, and variations of the method are contemplated. For example, in various embodiments, the generation code may be operable to programmatically generate execution-time code for the SDB node based on or in response to any of various other events, conditions, or information besides input received to edit the graphical program. Similarly, the design-time behavior code may also be operable to affect design-time behavior of the SDB node based on or in response to factors other than input received to edit the graphical program.

For example, in one embodiment the method may comprise determining code generation dependency information, wherein the generation code is operable to generate or modify the execution-time code for the SDB node based on or depending on the code generation dependency information. In various embodiments, the code generation dependency information may include information of any kind and from any source. For example, the code generation dependency information may be associated with one or more of:

a state of the graphical program; a state of the SDB node or another node in the graphical program; a state of a graphical programming development environment application used to create the graphical program; etc.

As one example, the graphical programming development environment may allow the user to set options regarding a computing platform on which the graphical program is intended to execute. Thus, execution-time code for the SDB node may be generated differently depending on the target platform. For example, if the graphical program will execute on an FPGA device, the execution-time code may be generated in such a way as to facilitate the graphical program to execute efficiently when deployed on the FPGA device.

In other embodiments, the code generation dependency information may include information determined from a source external to the graphical program and external to a graphical programming development environment application used to create the graphical program. For example, the code generation dependency information may be received from a second application external to the graphical programming development environment application, such as another programming environment application or another type of application. As another example, the code generation dependency information may be received from a computer server via a network. For example, the computer server may provide information to allow the execution-time code of the SDB node to be updated periodically, e.g., to extend the functionality of the SDB node or to provide bug fixes.

As another example of code generation dependency information, the generation code may be operable to programmatically generate or modify execution-time code for the SDB node based on the user's history of using the SDB node. For example, when the SDB node was previously used in a first graphical program, the user may have utilized a configuration user interface to configure the SDB node as described above, and execution-time code may have been dynamically generated based on the user's input. The configuration information specified by the user may be stored such that when the user later includes the SDB node in a second graphical program, the SDB node is automatically configured as in the first graphical program, and execution-time code for the SDB node in the second graphical program may be programmatically generated identically as in the first graphical program. Also, separate history information may be maintained for different users, e.g., so that the SDB node may behave differently when different users are creating graphical programs.

Also, in one embodiment the generation of the execution-time code may depend on input received from other sources besides a user. For example, the above-incorporated patent application titled, "System and Method for Programmatically Generating a Graphical Program in Response to Program Information" discloses a method in which a client application may programmatically specify the creation of a graphical program. Thus, for example, a server application may programmatically create the graphical program based on input received from the client application. Where the client application specifies the inclusion of an SDB node in the graphical program, the execution-time code for the SDB node may be dynamically generated based on other information specified by the client application, such as other nodes specified for inclusion in the graphical program, data types of inputs specified for connection to the SDB node's input terminals, etc.

The design-time behavior code may also execute in response to factors other than input to edit the graphical program. For example, the design-time behavior code may be operable to affect design-time behavior of the SDB node based on design-time behavior information, wherein the design-time behavior information may include information of any kind and from any source. As one example, the design-time behavior information may be received from a second application external to the graphical programming development environment application used to create the graphical program. For example, the user may use an external application to configure hardware devices coupled to the computer system. For example, if a data acquisition (DAQ) device is coupled to the computer system, the user may create various named channels referencing the device. Thus, if the SDB node is designed to perform a DAQ-related function, then the design-time behavior code associated with the SDB node may be operable to determine the channel information and affect design-time behavior of the SDB node in various ways based on the channel information. For example, if the user specifies an invalid channel as an input to the SDB node, the design-time behavior code may be operable to alert the user of this error, e.g., by affecting the appearance of the SDB node or otherwise drawing the user's attention.

It is noted that the above examples of the generation code programmatically generating or modifying execution-time code for the SDB node are intended to be exemplary only, and many other possible uses of the generation code are contemplated. Similarly, the above examples of the design-time behavior code affecting behavior of the SDB node are intended to be exemplary only, and many other possible uses of the design-time behavior code are contemplated.

Figure 12:
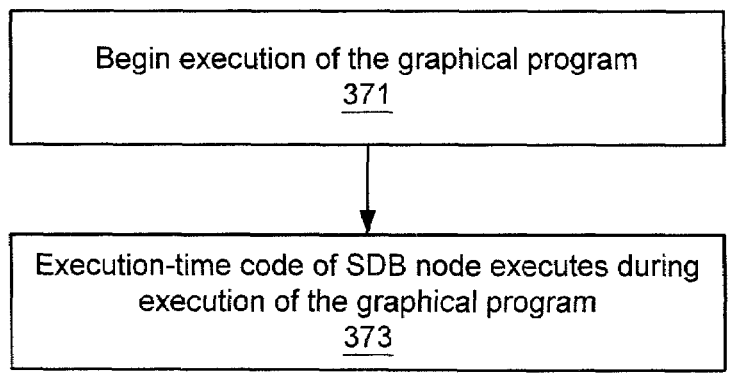
FIG. 12 is a flowchart diagram illustrating one embodiment of a method for executing a graphical program that includes a self-determining behavior (SDB) node.

FIG. 12—Executing a Graphical Program that Includes an SDB Node

FIG. 12 is a flowchart diagram illustrating one embodiment of a method for executing a graphical program that includes a self-determining behavior (SDB) node. It is noted that FIG. 12 illustrates a representative embodiment, and alternative embodiments are contemplated. Also, various steps may be combined, omitted, or performed in different orders.

In 371, the graphical program may begin execution. The graphical program may be executed on any kind of computer system(s) or (re)configurable hardware.

In 373, the execution-time code of the SDB node in the graphical program may be executed, wherein the execution-time code was programmatically generated or modified by generation code associated with the SDB node, as described above with reference to FIG. 11.

Implementation Details

In various embodiments, the SDB nodes and methods described above may be implemented in various ways, e.g., depending on the particular graphical programming development environment used. In one embodiment, an interface may be defined between the graphical programming development environment and the SDB node such that the graphical programming development environment is operable to call into the generation code and/or the design-time behavior code of the SDB node in response to various events or conditions, such as those described above. In various embodiments, the generation code or design-time behavior code may be called at any point during execution of a graphical programming development environment application.

As one example, the interface may define an "input connection" operation such that the graphical programming development environment is operable to call into a specific portion of the generation code and/or the design-time behavior code in response to an input being connected to an input terminal of the SDB node. In various embodiments, the interface may be implemented in any way and may define any kind of event, condition, or other factor that causes execution of a portion of the generation code or design-time behavior code.

The generation code and design-time behavior code may be modularized such that specific portions of the code may be executed in response to particular events or conditions. In various embodiments, the code may be modularized in any way, e.g., depending on a particular implementation, such as whether the code includes graphical code and/or text-based code, etc. For example, the portions of code may be constructed in the form of subprogram nodes, callback functions or methods, cases in a case structure, or in any other way desired.

A few examples of when portions of the generation code or design-time behavior code may be invoked include: when the user first includes an SDB node in a graphical program; when the user moves the SDB node within the graphical program; when the user re-sizes the SDB node; when the user connects an input or output to the SDB node; when the user requests to compile a graphical program that includes the SDB node; when the user clicks on the SDB node; when the user moves a mouse cursor over the SDB node; when a graphical program including the SDB node is initially opened; when the SDB node is painted or drawn on the display; etc. These are just a few examples, and the generation code or design-time behavior code may be invoked in response to any other situation as desired.

In one embodiment, in addition to an interface defining points in which the graphical programming development environment may call into the code of the SDB node, an interface may also define points in which the code of the SDB node may call into the graphical programming development environment. For example, in one embodiment the graphical programming development environment may "listen for" various actions that the generation code or design-time behavior code of the SDB node performs when the code is executed. For example, the graphical programming development environment may listen for a request to display a configuration user interface; a request to generate execution-time code; a request to display a new icon in the block diagram; a request to connect to a server to retrieve information; etc.

As one example, the graphical programming development environment may invoke the generation code of the SDB node when a graphical program including the SDB node is compiled. The generation code may then attempt to dynamically generate execution-time code for the SDB node. However, if a problem with the configuration of the SDB node is discovered during this process, the generation code may request the graphical programming development environment to interrupt the compilation process and display an informative message to the user.

FIGS. 13–16: Example of a Polymorphic SDB Node

In some prior art implementations of polymorphic subprogram nodes, the user was required to create a separate subprogram node to handle each case, i.e., each data type or combination of data types. An SDB node such as described above may eliminate the need to create a separate case for each data type or combination of data types. Instead, the generation code associated with the SDB node may be operable to programmatically generate appropriate execution-time code for whatever combination of data types the user connects to the SDB node. This may enable the subprogram node to be completely polymorphic, e.g., to handle all possible data types or combinations of data types in situations where this was not practical before because the number of polymorphic combinations was too large.

FIGS. 13–16 illustrate an exemplary implementation of a polymorphic addition SDB node, i.e., an SDB node operable to "add" inputs of various data types. For example, if the user connects two inputs having integer data types to the SDB node, the SDB node may be operable to output an integer sum. If the user connects two inputs having string data types to the SDB node, the SDB node may be operable to output a string concatenation of the two strings.

Figure 13:
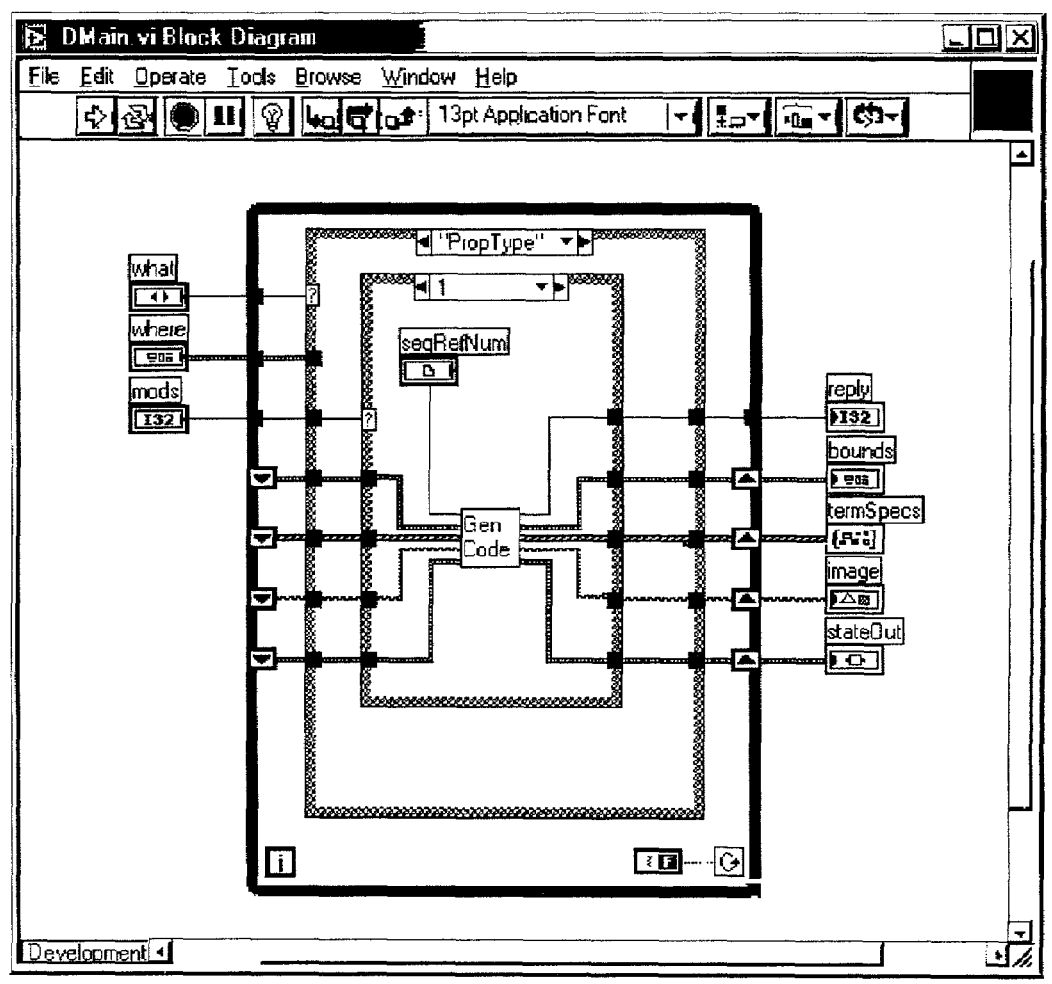
FIGS. 13–14, 15A, 15B and 16 illustrate an exemplary implementation of a polymorphic addition SDB node.
Figure 14:
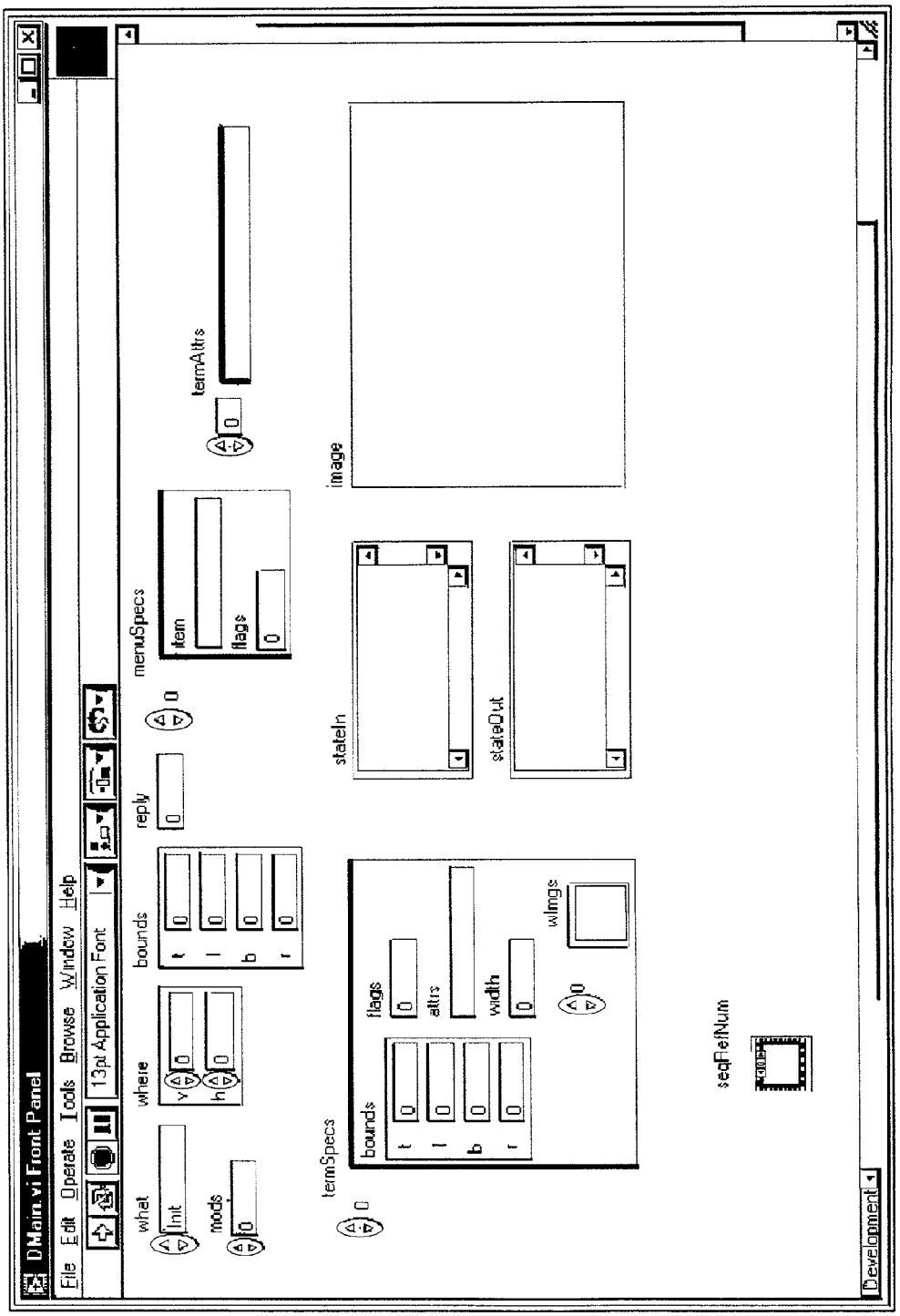

In the example of FIGS. 13–16, the generation code is implemented as a block diagram associated with the SDB node, as shown in FIG. 13. In this example, generation code and design-time behavior code are both included together in the same block diagram. FIG. 13 illustrates a block diagram including two nested case structures. The outermost case structure (labeled "PropType") includes cases that correspond to points at which the generation code/design-time behavior code may be called, i.e., the cases are defined by an interface between the graphical programming development environment and the SDB node such as described above. FIG. 14 illustrates a graphical view of this interface. For example, the input control labeled "what" includes items that match the cases in the outermost case structure shown in FIG. 13.

In FIG. 13, the "PropType" case is shown selected in the outermost case structure. The code for the "PropType" (i.e., type propagation) case may be invoked when the type information is propagated to the SDB node, such as when the user connects inputs to the SDB node. In response, the execution-time code for the SDB node may be programmatically generated, wherein the execution-time code is generated in such a way as to have appropriate functionality depending on the connected data types. For example, as described above, if the user connects two inputs with integer data types to the SDB node, the execution-time code may be generated so as to be operable to output an integer sum; if the user connects two inputs with string data types to the SDB node, the execution-time code may be generated so as to be operable to output a string concatenation; etc.

Figure 15A:
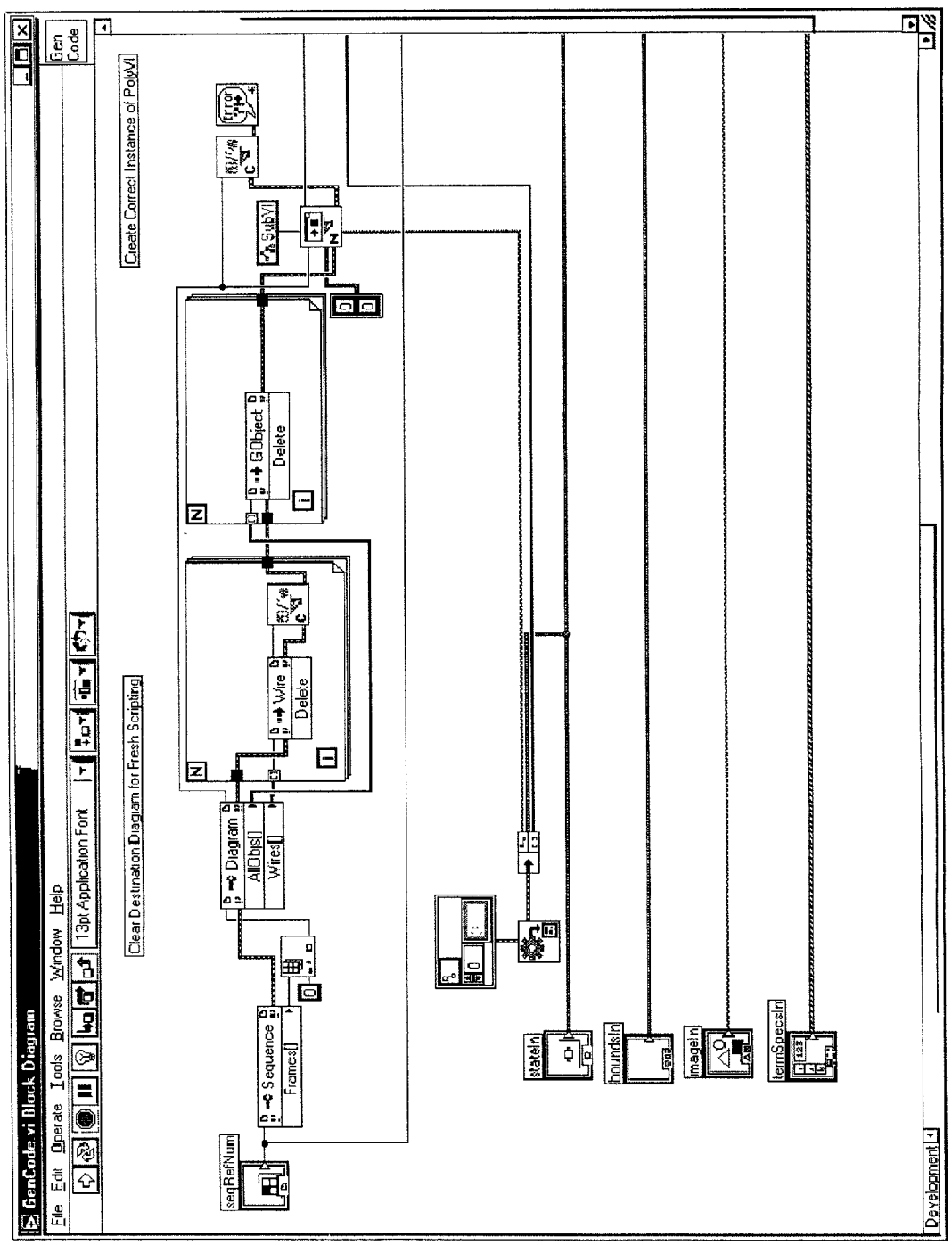
Figure 15B:
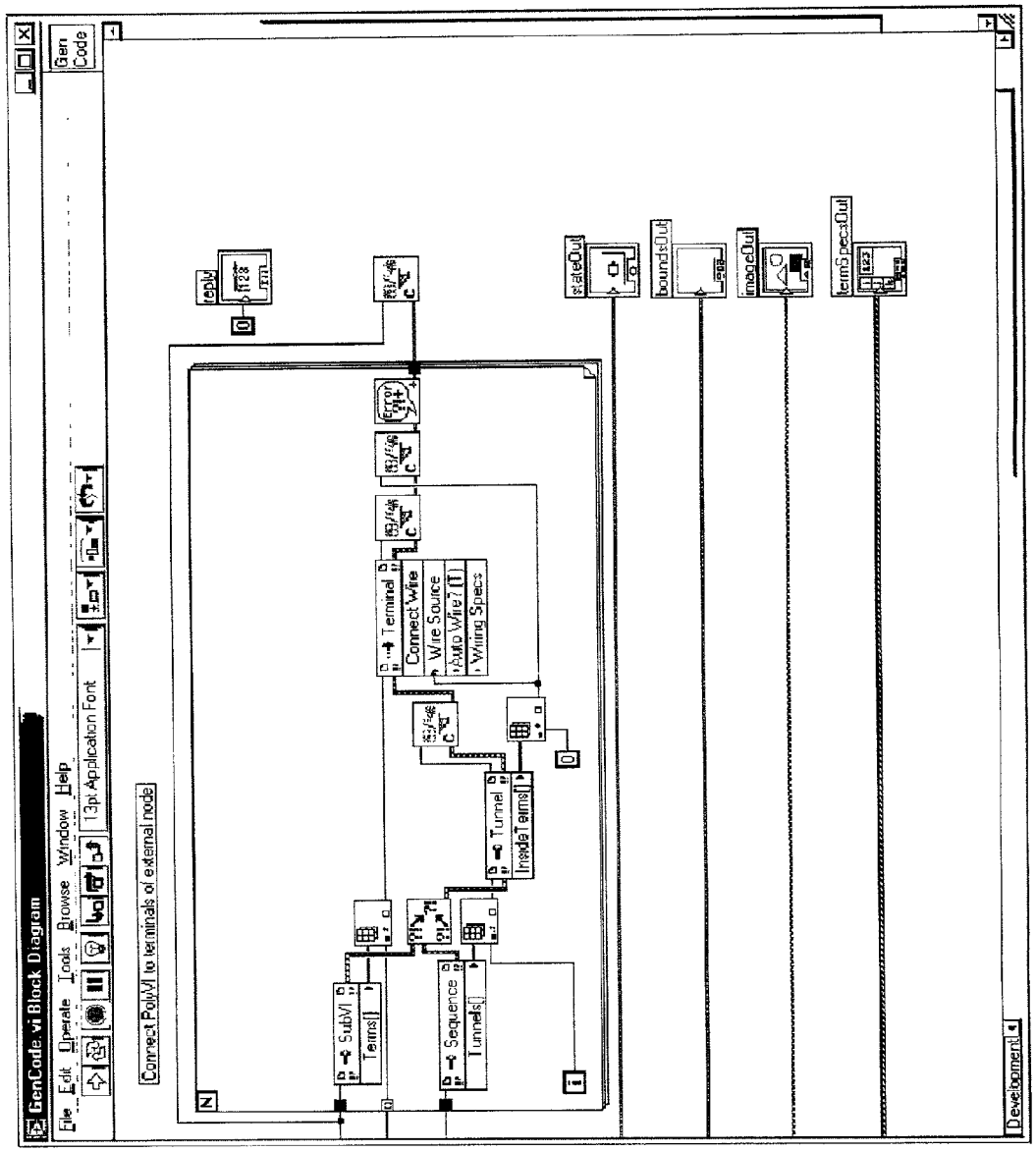

The subprogram node labeled "Gen Code" is operable to perform the actual generation of the execution-time code. FIGS. 15A and 15B illustrate graphical code associated with the "Gen Code" subprogram node.

Figure 16:
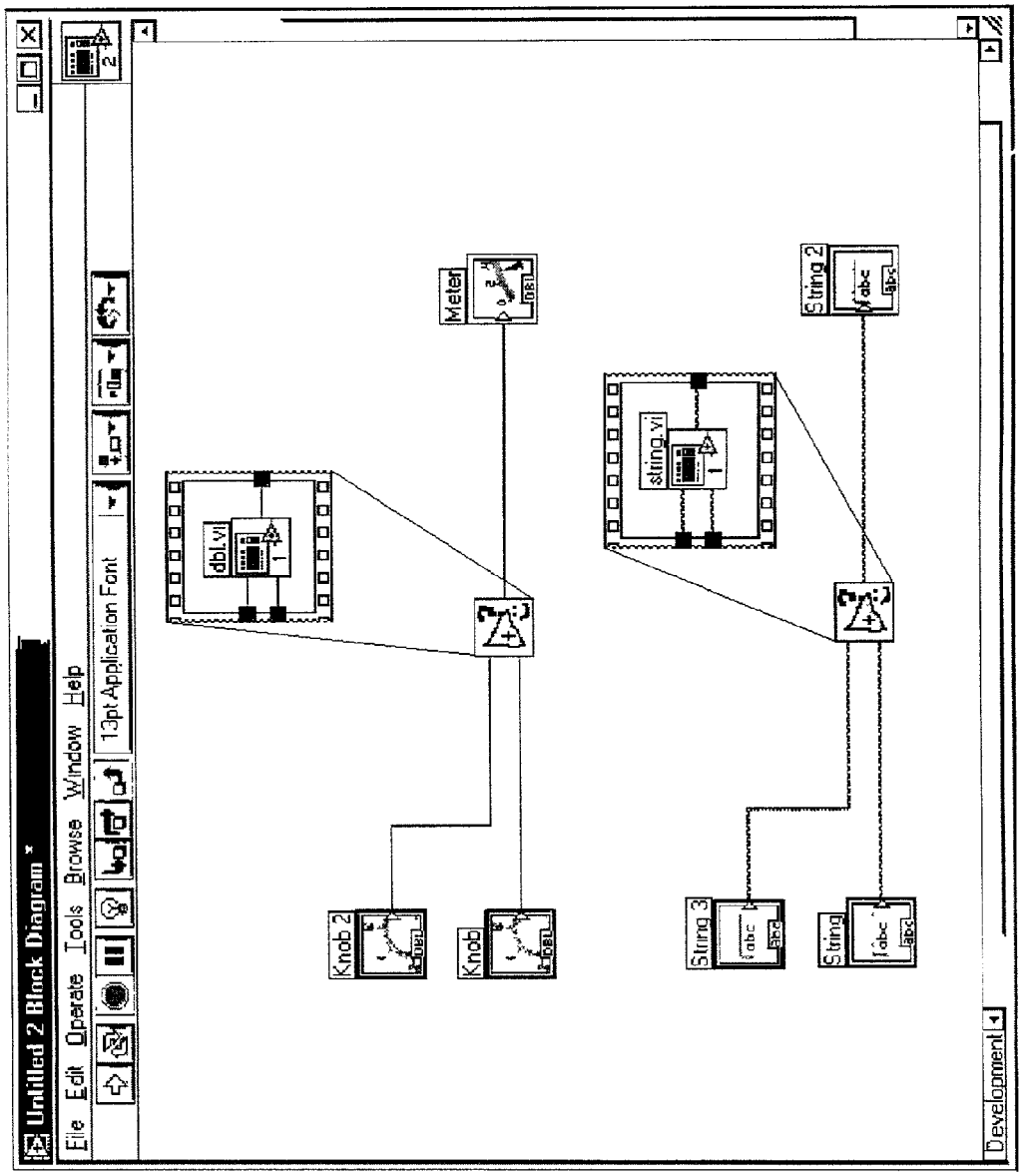

FIG. 16 illustrates an exemplary graphical program that includes two instances of the SDB node described above, e.g., illustrates a main block diagram of the graphical program, such as described above with reference to FIG. 9. Two nodes labeled "Knob" and "Knob 2" which produce outputs having a "double" data type are shown connected to a first instance of the SDB node. In this case, code operable to add the two inputs to produce an output of type "double" was programmatically generated, as represented by the node labeled "dbl.vi". (The node labeled "dbl.vi" is not actually displayed in the graphical program, but is shown in FIG. 16 for illustrative purposes to show what is conceptually "behind" the first instance of the SDB node.) Similarly, two nodes labeled "String" and "String 3" which produce outputs having a "string" data type are shown connected to a second instance of the SDB node. In this case, code operable to concatenate the two inputs to produce an output of type "string" was programmatically generated, as represented by the node labeled "string.vi". (The node labeled "string.vi" is not actually displayed in the graphical program, but is shown in FIG. 16 for illustrative purposes to show what is conceptually "behind" the second instance of the SDB node.)

It is noted that FIGS. 13–16 illustrate one particular example of an SDB node, wherein the SDB node is implemented in one particular way within the LabVIEW graphical programming development environment. However, in various embodiments, an SDB node designed for any purpose may be utilized within any graphical programming development environment and may be implemented in any way, e.g., depending on the requirements of and programming features available within the particular graphical programming development environment.

Figure 17:
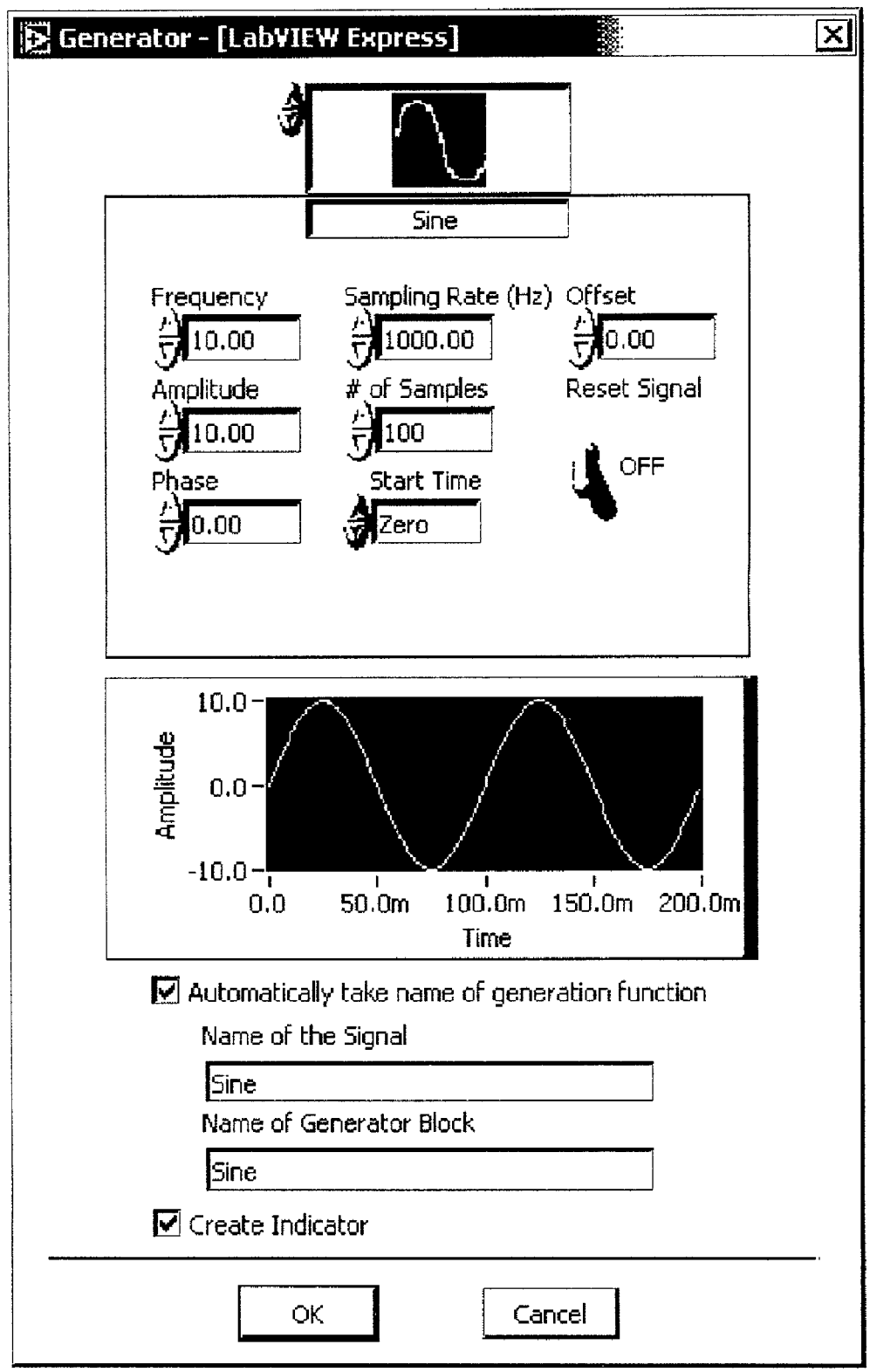
FIG. 17 illustrates an exemplary configuration user interface for configuring a waveform generator SDB node.

FIG. 17—Exemplary Configuration User Interface

As described above, in one embodiment, an SDB node may have an associated configuration user interface for receiving user input to configure the SDB node. FIG. 17 illustrates an exemplary configuration user interface for configuring an SDB node designed to generate waveforms. In response to the user specifying different settings for the GUI controls on the configuration user interface, different execution-time code may be programmatically generated for the waveform generator SDB node.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for creating a first graphical program, the method comprising:
   displaying a first node in a block diagram of the first graphical program, wherein the first node includes generation code for automatically generating execution-time code for the first node;
   receiving first input to edit the first graphical program after said displaying the first node in the block diagram;
   the generation code included in the first node executing to automatically generate first execution-time code for the first node based on the first input, wherein the generation code automatically generates the execution-time code without user input specifying the execution-time code; and
   executing the first graphical program, wherein executing the first graphical program comprises executing the first node, wherein executing the first node comprises executing the first execution-time code automatically generated by the generation code included in the first node.

2. The method of claim 1,
   wherein said generation code included in the first node executing to automatically generate the first execution-time code comprises the generation code included in the first node executing to automatically generate the first execution-time code prior to execution of the first graphical program.

3. The method of claim 1,
   wherein the generation code included in the first node is operable to automatically generate different portions of execution-time code having different functionality for the first node.

4. The method of claim 1, further comprising:
   receiving second input to edit the first graphical program after said receiving the first input;
   the generation code included in the first node automatically generating second execution-time code for the first node based on the second input;
   wherein the second execution-time code for the first node replaces the first execution-time code for the first node;
   wherein the automatically generated second execution-time code implements different functionality than the automatically generated first execution-time code.

5. The method of claim 1,
   wherein the generation code included in the first node executes to automatically generate the first execution-time code for the first node in response to the first input received to edit the first graphical program.

6. The method of claim 1, further comprising:
   compiling the first graphical program;
   wherein the generation code included in the first node executes to automatically generate the first execution-time code for the first node during the compilation of the first graphical program.

7. The method of claim 1,
   wherein the first node does not have any execution-time code when the first node is initially displayed in the block diagram of the first graphical program.

8. The method of claim 1,
   wherein the first node has initial execution-time code when the first node is initially displayed in the block diagram of the first graphical program;
   wherein said generation code included in the first node automatically generating the first execution-time code for the first node comprises the generation code included in the first node replacing the initial execution-time code with the first execution-time code.

9. The method of claim 1,
   wherein the first node has initial execution-time code when the first node is initially displayed in the block diagram of the first graphical program;
   wherein said generation code included in the first node automatically generating the first execution-time code for the first node comprises the generation code included in the first node modifying the initial execution-time code.

10. The method of claim 1,
    wherein said generation code included in the first node automatically generating the first execution-time code for the first node comprises the generation code included in the first node automatically generating an execution-time block diagram for the first node, wherein the execution-time block diagram for the first node is different than the block diagram in which the first node is displayed, wherein the execution-time block diagram for the first node visually indicates execution-time functionality of the first node;
    wherein said executing the first execution-time code for the first node comprises executing the execution-time block diagram for the first node.

11. The method of claim 10,
    wherein said generation code included in the first node automatically generating the execution-time block diagram for the first node comprises the generation code included in the first node automatically including a plurality of interconnected nodes in the execution-time block diagram for the first node without user input specifying nodes in the plurality of interconnected nodes.

12. The method of claim 1,
    wherein said generation code included in the first node automatically generating the first execution-time code for the first node comprises the generation code included in the first node automatically generating first graphical code for the first node, wherein the first graphical code for the first node visually indicates execution-time functionality of the first node;

wherein said executing the first execution-time code for the first node comprises executing the first graphical code for the first node.

13. The method of claim 12, wherein the first graphical code for the first node includes a plurality of objects, wherein the generation code included in the first node automatically generates the first graphical code for the first node without user input specifying the objects.

14. The method of claim 1, wherein said generation code included in the first node automatically generating the first execution-time code for the first node comprises the generation code included in the first node automatically generating first text-based code for the first node;

wherein said executing the first execution-time code for the first node comprises executing the first text-based code for the first node.

15. The method of claim 1, wherein the block diagram in which the first node is displayed is a first block diagram;

wherein the first node includes a second block diagram that comprises the generation code, wherein the second block diagram comprises a plurality of interconnected nodes that visually indicate functionality performed by the generation code.

16. The method of claim 15, further comprising:

executing the second block diagram, wherein said executing the second block diagram comprises executing the plurality of interconnected nodes in the second block diagram;

wherein the second block diagram executes to perform said automatically generating the first execution-time code for the first node.

17. The method of claim 1, wherein the generation code included in the first node comprises a plurality of interconnected nodes that visually indicate functionality performed by the generation code.

18. The method of claim 1, wherein the generation code included in the first node comprises text-based code that defines functionality performed by the generation code.

19. The method of claim 1, further comprising:

displaying a configuration user interface for configuring the first node;

wherein said receiving the first input to edit the first graphical program comprises receiving user input to the configuration user interface to configure the first node;

wherein said generation code included in the first node automatically generating the first execution-time code based on the first input comprises the generation code included in the first node automatically generating the first execution-time code based on the user input to the configuration user interface.

20. The method of claim 19, wherein said receiving user input to the configuration user interface to configure the first node comprises receiving user input specifying desired execution functionality for the first node;

wherein said automatically generating the first execution-time code based on the user input to the configuration user interface comprises automatically generating the first execution-time code to implement the specified execution functionality for the first node.

21. The method of claim 19, wherein the configuration user interface enables a user to configure the first node to perform one or more operations from a plurality of operations;

wherein said receiving the user input to the configuration user interface to configure the first node comprises receiving user input to the configuration user interface to specify one or more desired operations for the first node from the plurality of operations;

wherein said automatically generating the first execution-time code based on the user input to the configuration user interface comprises automatically generating the first execution-time code to implement the one or more desired operations, such that the first node is operable to perform the one or more desired operations during execution of the graphical program.

22. The method of claim 1, wherein said receiving the first input to edit the first graphical program comprises receiving user input to the block diagram of the first graphical program;

wherein said automatically generating the first execution-time code for the first node based on the first input comprises automatically generating the first execution-time code based on the user input to the block diagram of the first graphical program.

23. The method of claim 22, wherein said receiving the user input to the block diagram of the first graphical program comprises receiving user input to connect the first node to one or more other nodes in the block diagram;

wherein said automatically generating the first execution-time code for the first node comprises automatically generating the first execution-time code based on said connecting the first node to the one or more other nodes in the block diagram.

24. The method of claim 1, wherein said receiving the first input to edit the first graphical program comprises receiving user input to connect an input to an input terminal of the first node;

wherein said automatically generating the first execution-time code for the first node comprises automatically generating the first execution-time code based on the input connected to the input terminal of the first node.

25. The method of claim 24, wherein said automatically generating the first execution-time code for the first node based on the input connected to the input terminal of the first node comprises automatically generating the first execution-time code based on a data type of the input connected to the input terminal of the first node.

26. The method of claim 1, wherein said receiving the first input to edit the first graphical program comprises receiving user input to connect an output from an output terminal of the first node to an input terminal of a second node in the block diagram of the first graphical program;

wherein said automatically generating the first execution-time code for the first node comprises automatically generating the first execution-time code based on said connecting the output from the output terminal of the first node to the input terminal of the second node.

27. The method of claim 22,
wherein said receiving user input to the block diagram of the first graphical program comprises receiving user input to the first node displayed in the block diagram;
wherein said automatically generating the first execution-time code for the first node comprises automatically generating the first execution-time code based on the user input to the first node displayed in the block diagram.

28. The method of claim 1,
wherein said receiving the first input to edit the first graphical program comprises receiving input to edit a user interface of the first graphical program;
wherein said automatically generating the first execution-time code for the first node comprises automatically generating the first execution-time code based on the input to edit the user interface of the first graphical program.

29. The method of claim 1, further comprising:
creating the first node prior to said displaying the first node in the block diagram of the first graphical program;
wherein said creating the first node comprises creating the generation code and including the generation code in the first node so that the first node encapsulates the generation code.

30. The method of claim 1,
wherein the block diagram of the first graphical program includes a plurality of interconnected nodes that visually indicate functionality of the first graphical program.

31. The method of claim 1,
wherein the first graphical program comprises the block diagram and a user interface portion, wherein the user interface portion is displayed separately from the block diagram.

32. The method of claim 1,
wherein the first graphical program comprises a graphical data flow program.

33. The method of claim 1,
wherein the first input to edit the first graphical program comprises user input to edit the first graphical program;
wherein said automatically generating the first execution-time code for the first node comprises automatically generating the first execution-time code based on the user input.

34. The method of claim 1,
wherein the generation code included in the first node executes to automatically generate the first execution-time code for the first node at edit-time of the first graphical program.

35. The method of claim 1,
wherein said displaying the first node in the block diagram of the first graphical program comprises displaying a first instance of the first node in the block diagram of the first graphical program, wherein the automatically generated first execution-time code is associated with the first instance of the first node;
wherein the method further comprises:
displaying a second instance of the first node in a block diagram of a second graphical program, wherein the second instance of the first node includes generation code for automatically generating execution-time code for the second instance of the first node;
receiving second input to edit the second graphical program;
the generation code included in the second instance of the first node executing to automatically generate second execution-time code for the second instance of the first node in the second graphical program based on the second input; and
executing the second graphical program, wherein executing the second graphical program comprises executing the second instance of the first node in the second graphical program, wherein executing the second instance of the first node in the second graphical program comprises executing the second execution-time code;
wherein the second execution-time code automatically generated for the second instance of the first node in the second graphical program has functionality that is different from functionality of the first execution-time code automatically generated for the first instance of the first node in the first graphical program.

36. The method of claim 1,
wherein the first node further includes design-time behavior code operable to affect design-time behavior of the first node.

37. The method of claim 36, further comprising:
receiving second input to edit the first graphical program; and
the design-time behavior code included in the first node executing to affect design-time behavior of the first node in response to the second input.

38. The method of claim 36, further comprising:
the design-time behavior code included in the first node executing to affect design-time behavior of the first node in response to the first input.

39. The method of claim 38,
wherein said design-time behavior code included in the first node executing to affect design-time behavior of the first node comprises the design-time behavior code included in the first node executing to affect an appearance of the first node displayed in the block diagram of the first graphical program.

40. The method of claim 1, further comprising:
displaying the first execution-time code automatically generated for the first node.

41. The method of claim 1,
wherein a graphical programming development environment is used in creating the first graphical program;
wherein the graphical programming development environment does not allow a user to view the first execution-time code automatically generated for the first node.

42. The method of claim 1,
wherein said displaying the first node in the block diagram of the first graphical program comprises displaying a first instance of the first node in the block diagram of the first graphical program;
wherein the automatically generated first execution-time code is associated with the first instance of the node in the first graphical program;
wherein the method further comprises:
displaying a second instance of the first node in the block diagram of the first graphical program, wherein the second instance of the first node includes generation code for automatically generating execution-time code for the second instance of the first node;
receiving second input to edit the first graphical program; and the generation code included in the second instance of the first node automatically generating second execution-time code for the second instance of the first node in response to the second input, wherein the automatically generated second execution-time code is different than the automatically generated first execution-time code.

43. The method of claim 1,
wherein the first node is stored on a memory medium as one or more data structures representing the first node;
wherein the generation code included in the first node is stored in the one or more data structures representing the first node.

44. A method for creating a first graphical program, the method comprising:
displaying a first node in a block diagram of the first graphical program, wherein the first node includes generation code for automatically generating execution-time code, wherein the generation code is operable to automatically generate different types of execution-time code;
receiving input to edit the first graphical program after said displaying the first node in the block diagram; and
executing the generation code included in the first node to automatically generate first execution-time code for the first graphical program, wherein the first execution-time code implements first functionality, wherein the first execution-time code is automatically generated based on the input.

45. The method of claim 44,
wherein the first execution-time code automatically generated by the generation code included in the first node comprises execution-time code for the first node in the first graphical program.

46. The method of claim 44, further comprising:
executing the first graphical program, wherein said executing the first graphical program includes executing the first execution-time code.

47. A method for creating a first graphical program, the method comprising:
displaying a first node in a block diagram of the first graphical program, wherein the first node includes generation code for automatically generating execution-time graphical code for the first node;
receiving first input to edit the first graphical program after said displaying the first node in the block diagram;
the generation code included in the first node executing to automatically generate first execution-time graphical code for the first node based on the first input, wherein the first execution-time graphical code comprises a plurality of interconnected nodes that visually indicate functionality of the first execution-time graphical code, wherein the generation code included in the first node automatically generates the plurality of interconnected nodes in the first execution-time graphical code without user input specifying nodes in the plurality of interconnected nodes; and
executing the first graphical program, wherein executing the first graphical program comprises executing the first node, wherein executing the first node comprises executing the first execution-time graphical code generated by the generation code included in the first node.

48. The method of claim 47,
wherein the block diagram of the first graphical program comprises a first block diagram;
wherein said generation code included in the first node executing to automatically generate the first execution-time graphical code for the first node comprises the generation code included in the first node executing to automatically generate a second block diagram for the first node, wherein the second block diagram is encapsulated by the first node in the first graphical program, wherein the second block diagram comprises the plurality of interconnected nodes that visually indicate the functionality of the first execution-time graphical code.

49. A method for creating a first graphical program, the method comprising:
displaying a first node in a first block diagram of the first graphical program, wherein the first node includes a second block diagram, wherein the second block diagram includes a plurality of interconnected nodes operable to automatically generate execution-time code associated with the first node;
receiving first input to edit the first graphical program; and
the plurality of interconnected nodes in the second block diagram included in the first node executing to automatically generate first execution-time code for the first node based on the first input.

50. A method for creating a graphical program, the method comprising:
displaying a first node in the graphical program, wherein the first node includes generation code for automatically generating execution-time code, wherein the generation code is operable to automatically generate different types of execution-time code;
connecting one or more input terminals of the first node to receive one or more outputs from one or more other nodes in the graphical program, in response to user input;
determining one or more data types of data provided by the one or more outputs connected to the one or more input terminals of the first node;
executing the generation code included in the first node to automatically generate first execution-time code, wherein the first execution-time code is automatically generated based on the one or more data types; and
executing the graphical program, wherein said executing the graphical program includes executing the first execution-time code automatically generated by the generation code included in the first node.

51. A computer-implemented method for creating a node for inclusion in a graphical program, the method comprising:
creating an iconic appearance for the node; and
storing one or more data structures representing the node, wherein said storing comprises storing generation code for the node in the one or more data structures representing the node;
wherein when the node is included in a first graphical program being developed, the generation code stored in the one or more data structures representing the node is executable to automatically generate execution-time code for the node, wherein the execution-time code for the node executes when the node executes during execution of the first graphical program.

52. The method of claim 51, further comprising:
creating the generation code for the node in response to user input.

53. The method of claim 51,
wherein the generation code for the node comprises a block diagram that includes a plurality of interconnected nodes that visually indicate functionality of the generation code;

wherein said storing the generation code for the node in the one or more data structures representing the node comprises storing the block diagram in the one or more data structures representing the node.

54. The method of claim 51,
wherein the generation code for the node comprises a plurality of interconnected nodes that visually indicate functionality of the generation code.

55. The method of claim 51,
wherein the first graphical program is created using a first graphical programming development environment installed on a first computer system;
wherein the method further comprises deploying the node to the first graphical programming development environment installed on the first computer system;
wherein said deploying the node to the first graphical programming development environment installed on the first computer system comprises storing the one or more data structures representing the node on a memory medium of the first computer system, wherein said storing the one or more data structures representing the node on the memory medium of the first computer system comprises storing the generation code for the node in the one or more data structures representing the node on the memory medium of the first computer system.

56. The method of claim 51,
wherein said storing the one or more data structures representing the node further comprises storing design-time behavior code for the node in the one or more data structures representing the node;
wherein when the node is included in the first graphical program being developed, the design-time behavior code is executable to affect design-time behavior of the node.

57. The method of claim 56,
wherein the design-time behavior code for the node comprises a plurality of interconnected nodes that visually indicate functionality of the design-time behavior code.

58. The method of claim 51,
wherein the generation code stored in the one or more data structures representing the node is executable to automatically generate the execution-time code for the node before execution of the first graphical program.

59. The method of claim 51,
wherein the generation code stored in the one or more data structures representing the node is executable to automatically generate different types of execution-time code for the node;
wherein the different types of execution-time code have different functionality.

60. The method of claim 59,
wherein the type of execution-time code actually generated for the node depends on input received to one or more of:
the first graphical program;
a graphical programming development environment used to create the first graphical program.

61. The method of claim 59, further comprising:
determining code generation dependency information;
wherein the type of execution-time code actually generated for the node depends on the code generation dependency information.

62. The method of claim 51, further comprising:
determining code generation dependency information, wherein determining the code generation dependency information comprises determining information based on one or more of:
a state of the node;
a state of the first graphical program;
a state of a graphical programming development environment application used to create the first graphical program;
wherein the generation code stored in the one or more data structures representing the node is executable to automatically generate the execution-time code for the node based on the code generation dependency information.

63. The method of claim 51, further comprising:
determining first information comprising information external to the first graphical program and external to a graphical programming development environment application used to create the first graphical program;
wherein the generation code stored in the one or more data structures representing the node is executable to automatically generate the execution-time code for the node based on the first information.

64. The method of claim 63,
wherein said determining the first information comprises determining information from a second application external to the graphical programming development environment application used to create the first graphical program;
wherein the generation code stored in the one or more data structures representing the node is executable to automatically generate the execution-time code for the node based on the information from the second application.

65. The method of claim 63,
wherein said determining the first information comprises receiving information from a computer server via a network;
wherein the generation code stored in the one or more data structures representing the node is executable to automatically generate the execution-time code for the node based on the information received from the computer server.

66. A method for creating a first graphical program, the method comprising:
displaying a first node in the first graphical program, wherein the first node includes generation code executable to automatically generate execution-time code for the first node, wherein the generation code is operable to automatically generate different types of execution-time code for the first node;
determining first information that affects the automatic generation of execution-time code for the first node;
executing the generation code included in the first node to automatically generate first execution-time code for the first node, wherein the automatic generation of the first execution-time code depends on the first information; and
executing the first graphical program, wherein executing the first graphical program comprises executing the first node, wherein executing the first node comprises executing the first execution-time code generated by the generation code included in the first node.

67. The method of claim 66,
wherein said displaying the first node in the first graphical program comprises displaying the first node in a first block diagram of the first graphical program;

wherein said automatically generating the first execution-time code for the first node comprises automatically generating a second block diagram for the first node, wherein automatically generating the second block diagram comprises automatically generating a plurality of interconnected nodes that visually indicate functionality of the first execution-time code for the first node;

wherein said executing the first execution-time code for the first node comprises executing the second block diagram for the first node.

68. The method of claim 66, wherein said determining the first information that affects the automatic generation of execution-time code for the first node comprises determining information based on one or more of:

a state of the first node;

a state of the first graphical program;

a state of a graphical programming development environment application used to create the first graphical program.

69. The method of claim 66, wherein said determining the first information that affects the automatic generation of execution-time code for the first node comprises determining information external to the first graphical program and external to a graphical programming development environment application used to create the first graphical program;

wherein the generation code included in the first node executes to automatically generate the first execution-time code for the first node based on the information external to the first graphical program and external to the graphical programming development environment application.

70. The method of claim 66, wherein said determining the first information comprises determining information from a second application external to a graphical programming development environment application used to create the first graphical program;

wherein the generation code included in the first node executes to automatically generate the first execution-time code for the first node based on the information from the second application.

71. The method of claim 66, wherein said determining the first information comprises receiving information from a computer server via a network;

wherein the generation code included in the first node executes to automatically generate the first execution-time code for the first node based on the information received from the computer server.

72. The method of claim 66, wherein said executing the generation code included in the first node comprises executing the generation code included in the first node to automatically generate the first execution-time code for the first node while compiling the first graphical program.

73. The method of claim 66, further comprising:

launching a graphical programming development environment used to create the first graphical program;

wherein said determining the first information comprises determining the first information in response to said launching the graphical programming development environment;

wherein said executing the generation code included in the first node comprises executing the generation code included in the first node to automatically generate the first execution-time code based on the first information when the graphical programming development environment is launched.

74. A memory medium comprising program instructions and data to implement:

a node for inclusion in a graphical program, wherein the node includes:

a first block diagram for execution during creation of the graphical program, wherein the first block diagram includes a first plurality of interconnected nodes visually indicating first functionality; and a second block diagram for execution during execution of the graphical program, wherein the second block diagram includes a second plurality of interconnected nodes visually indicating second functionality;

wherein the first block diagram is executable during creation of the graphical program to automatically generate the second block diagram, wherein the second block diagram executes during execution of the node in the graphical program.

75. A self-determining behavior (SDB) node for use in a graphical program, the self-determining behavior node comprising:

data specifying an iconic appearance, wherein the data is useable to display an iconic appearance representing the node in response to including the node in the graphical program;

one or more input and/or output terminals for connecting the node to other nodes in the graphical program; and generation code, wherein the generation code comprised in the node is operable to automatically generate execution-time code for the node in the graphical program, wherein the execution-time code automatically generated by the generation code comprised in the node executes when the node executes during execution of the graphical program.

* * * * *